United States Patent
Wegner et al.

(10) Patent No.: US 11,789,672 B2
(45) Date of Patent: *Oct. 17, 2023

(54) SYSTEM, METHOD, AND PROGRAM PRODUCT FOR DIGITAL PRODUCTION MANAGEMENT

(71) Applicant: Authentise Inc., Moffett Field, CA (US)

(72) Inventors: Andre P. Wegner, Atherton, CA (US); Melissa L. McCoy, Dallas, TX (US); Michael Lee Crogan, Stanford, CA (US)

(73) Assignee: Authentise Inc., Philadelphia, PA (US)

( * ) Notice: Subject to any disclaimer, the term of this patent is extended or adjusted under 35 U.S.C. 154(b) by 217 days.

This patent is subject to a terminal disclaimer.

(21) Appl. No.: 17/333,180

(22) Filed: May 28, 2021

(65) Prior Publication Data

US 2021/0382667 A1  Dec. 9, 2021

Related U.S. Application Data

(63) Continuation of application No. 16/841,148, filed on Apr. 6, 2020, now Pat. No. 11,029,896, which is a continuation of application No. 16/205,522, filed on Nov. 30, 2018, now Pat. No. 10,614,177, which is a continuation of application No. 14/172,449, filed on Feb. 4, 2014, now Pat. No. 10,204,178.

(60) Provisional application No. 61/849,977, filed on Feb. 4, 2013.

(51) Int. Cl.
| | | |
|---|---|---|
| G06F 3/12 | (2006.01) | |
| G06F 21/16 | (2013.01) | |
| G06Q 30/08 | (2012.01) | |
| G06F 30/00 | (2020.01) | |
| G06Q 10/06 | (2023.01) | |
| B33Y 50/02 | (2015.01) | |
| B29C 64/386 | (2017.01) | |
| G06Q 50/04 | (2012.01) | |
| G06F 111/02 | (2020.01) | |

(52) U.S. Cl.
CPC .......... *G06F 3/1212* (2013.01); *G06F 3/1222* (2013.01); *G06F 3/1238* (2013.01); *G06F 3/1244* (2013.01); *G06F 3/1288* (2013.01); *G06F 21/16* (2013.01); *G06F 30/00* (2020.01); *G06Q 10/06* (2013.01); *G06Q 30/08* (2013.01); *B29C 64/386* (2017.08); *B33Y 50/02* (2014.12); *G06F 3/122* (2013.01); *G06F 3/1267* (2013.01); *G06F 2111/02* (2020.01); *G06F 2206/1514* (2013.01); *G06F 2221/0733* (2013.01); *G06Q 50/04* (2013.01)

(58) Field of Classification Search
CPC ........................... A61K 38/164; G06F 3/1212
See application file for complete search history.

*Primary Examiner* — Simon P Kanaan
(74) *Attorney, Agent, or Firm* — Joseph E. Maenner; Maenner & Associates, LLC

(57) ABSTRACT

Systems, methods, and program products for managing digital production from one or more production devices with one or more sources providing inputs of production designs and/or production options are disclosed.

20 Claims, 24 Drawing Sheets

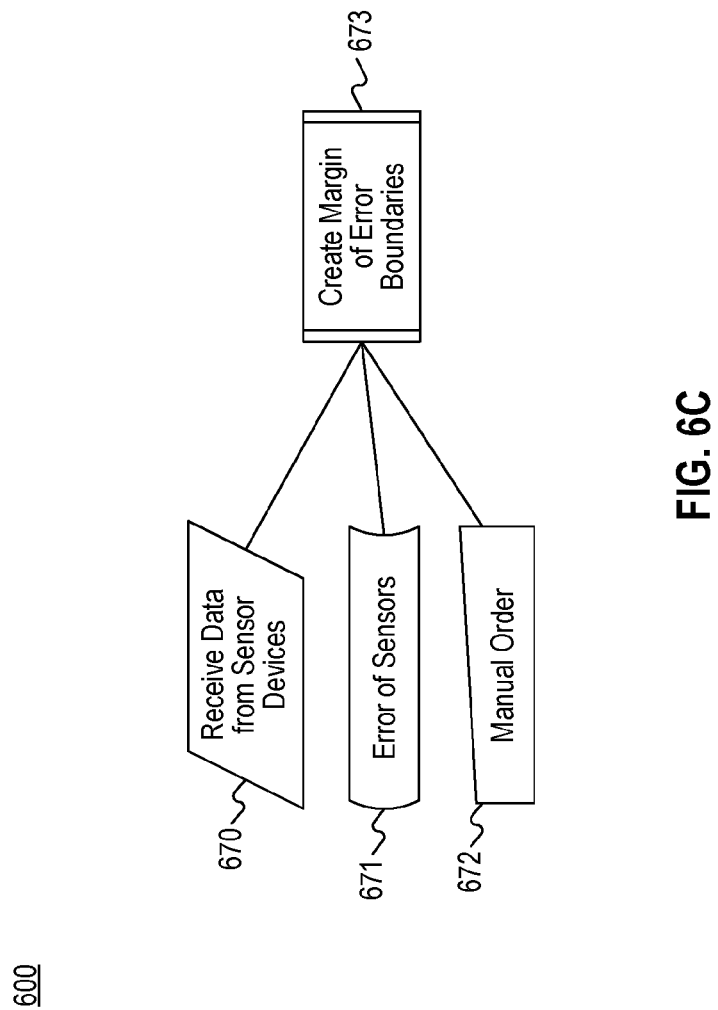

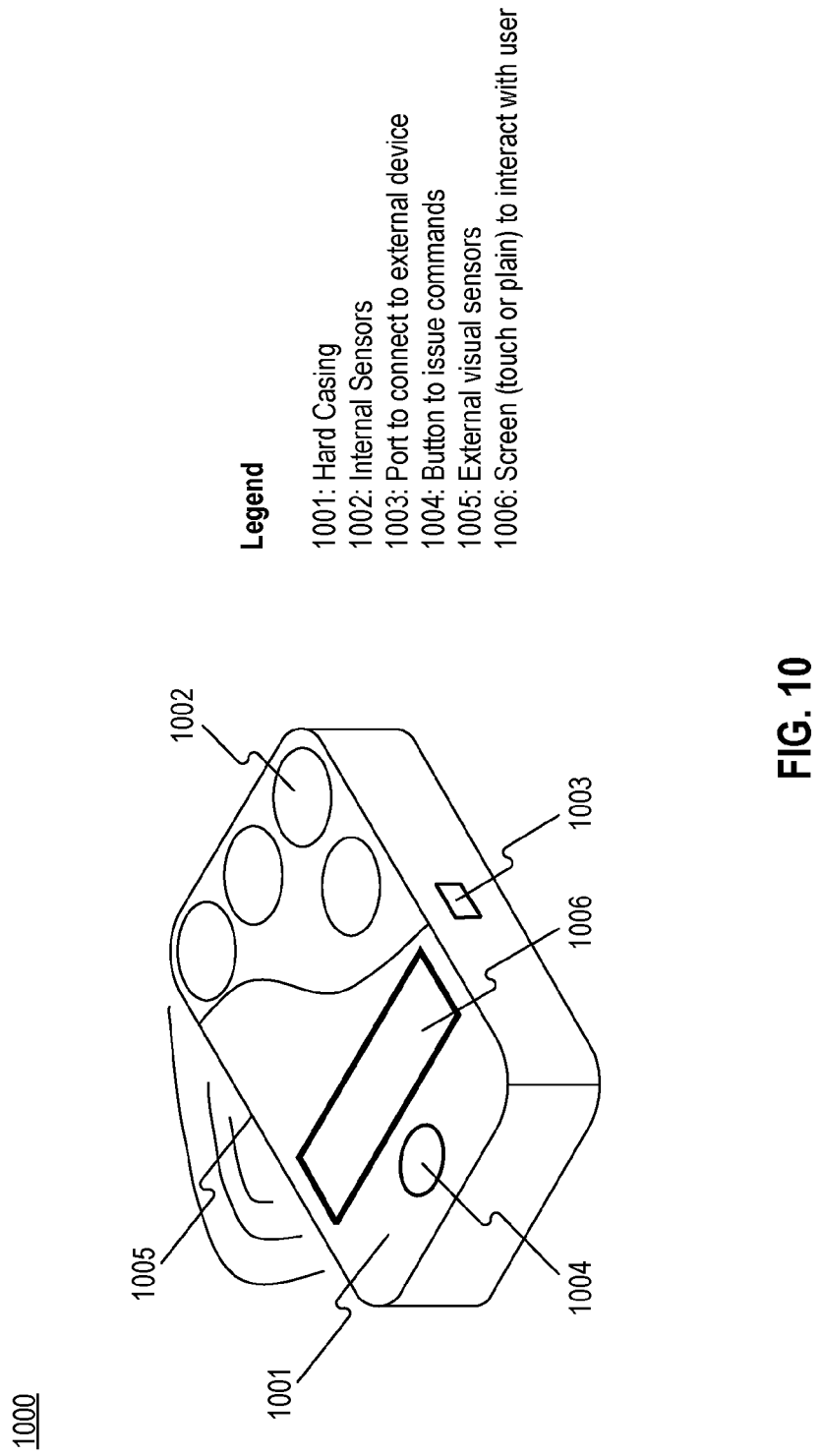

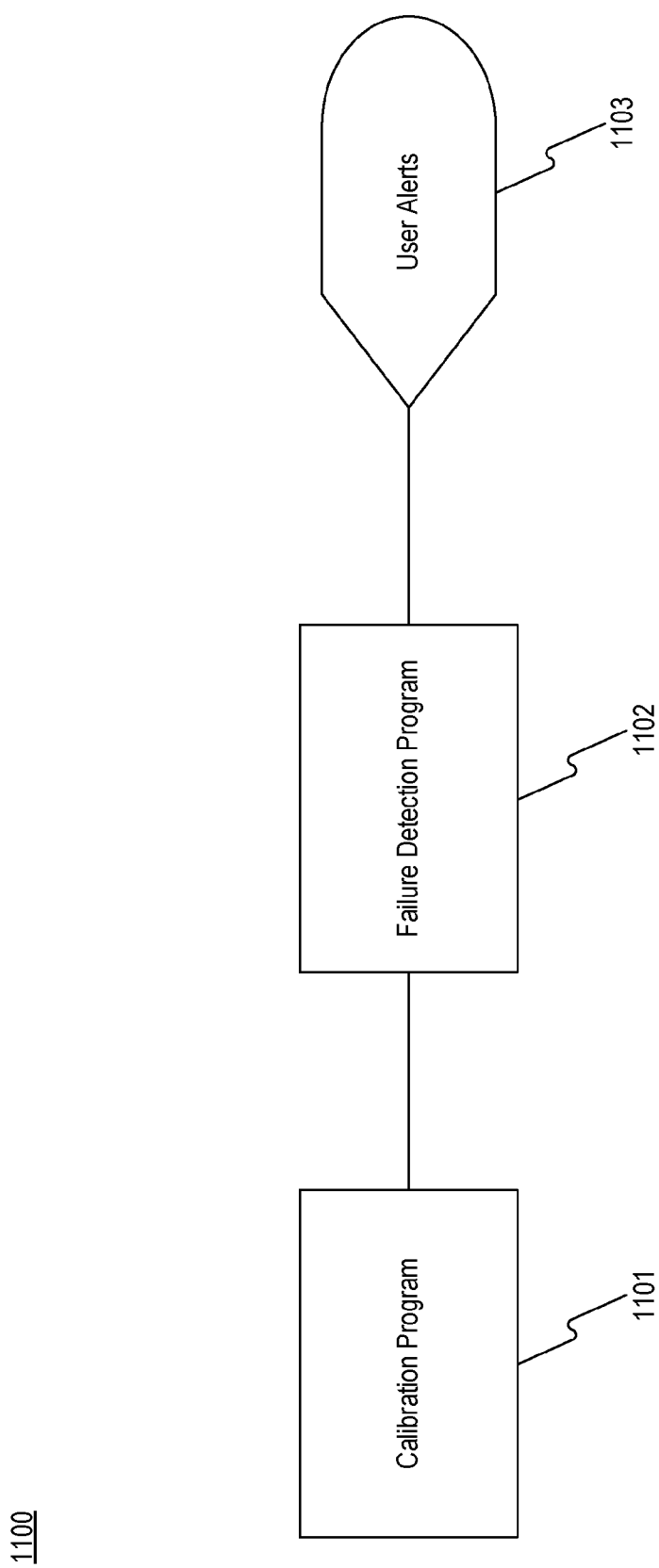

SYSTEM, METHOD, AND PROGRAM PRODUCT FOR DIGITAL PRODUCTION MANAGEMENT

CROSS-REFERENCE TO RELATED APPLICATIONS

This application is a continuation of U.S. patent application Ser. No. 14/172,449, filed on Feb. 4, 2014, which claims benefit to U.S. Ser. No. 61/849,977, filed on Feb. 4, 2013. The contents of the above-referenced applications are expressly incorporated by reference as if fully set forth herein.

FIELD

The present invention relates generally to management of digital production. Specifically, it relates to digital rights management, dynamic monitoring, and product authentication for digital production.

BACKGROUND

The process of moving from (1) guiding blueprints used by fabricators to (2) tool devices with high skill to (3) automatically executable manufacturing design files has begun and will continue. This Digital Manufacturing wave will lead many rights holders to wonder what will happen should the design files fall into the wrong hands. Automatic execution means that anybody can take a design and produce the intended object without high skill levels previously required. A level of protection of the design files, coupled with a process to ensure quality and authenticated objects is required in such a setting.

RELATED ART

The current art discloses authentication as described above, but there is a need in the art for authentication, dynamic monitoring, validation, identification and other inventions to all for open and wide spread use of digital manufacturing. U.S. Pat. No. 8,286,236 (Jung et. al.) discloses a manufacturing control system for additive manufacturing, a type of digital production, which includes confirming an authorization code is associated with the object design file, as described below. In addition, a significant portion of the current art that addresses additive manufacturing addresses narrow production modes, such as U.S. Pat. No. 7,957,824 (Boronvinskih et. al.), which addresses and claims specifically the field of dental items. Hence there is a need, and an opportunity, for technologies and platforms to unify and consolidate digital manufacturing.

In another vein, 3-D object identification (for example US Patent Publication 2002/0048396 (Bewley et. al.) systems are present in the art, but the field of 3-D object authentication, specifically, is still nascent, and there is a need for authentication (instead of mere identification) systems and methods to enable 3-D production commerce to flourish. The current art also contains digital authentication with reference external to the client (e.g., a time trusted external reference). For example, US Patent Publication 2002/0048396 (Stohwig et. al.). Application of such authentication to digital production and 3-D manufactured objects has complex and unique needs that the current invention addresses.

Other literature in the current art addresses specific aspects of 3-D printing (a form of digital production), such as 3-D model inconsistency correction (U.S. Pat. No. 8,175,734 (Forel et. al.)) and data interpolation (U.S. Pat. No. 7,917,243 (Kozlak et. al.)) The literature generally does not show an overarching and coherent approach to digital production and 3-D printing software infrastructure and management as disclosed in the present invention.

U.S. Pat. No. 8,286,236 (Jung et. al.) covers a broad array of "authorization" measures for manufacturing based on a data file—so the scope reaches even beyond additive manufacturing to production methods like extrusion, ejection, stamping, die casting, printing, painting, and tattooing and with materials that include "skin, textiles, edible substances, paper, and silicon printing." This patent only details the process of authorizing & delivering files to the production device and doesn't address production monitoring or end object authentication. Additionally, the Intellectual Ventures patent proposes associating an authorization code with every object data file. According to the patent, every manufacturing device is to be adapted to receive this authentication code and permitting it to interface with the object design file only when it does so. This is represents an entirely different process to the digital authentication process described in the present application, which only delivers parts of the object design file to the manufacturing device at a time upon request for the file. U.S. Pat. No. 8,286,236 essentially proposes embedding in the device a locked door that every file to be produced needs a key to, rather than offering a parallel doorway that only certain files need a key to, as in the present invention.

SUMMARY

Systems, methods, and program products for managing digital production from one or more production devices with one or more sources providing inputs of production designs and/or production options are disclosed.

In embodiments, a system for digital production comprising can comprise a digital production device, which can be a device for manufacturing a three-dimensional object. The system can further comprise a digital production management platform, which may have at least one or more processor and non-transitory computer-readable memory. The digital production management platform may be configured to receive a first data stream comprising an object design file. The production management platform may be further configured to transmit a second data stream to at least one of the one or more production devices, the second data stream comprising at least portions of an object design file. The production management platform may be configured to receive a feedback data stream from the one or more production devices comprising at least digital production status data.

In embodiments, the digital production system may receive and/or transmit data along the first data stream, the second data stream, and/or the feedback data stream.

In embodiments, the digital production device may be at least any of an additive printing device, a subtractive milling device, a CNC machining device, or a Deoxyribonucleic Acid ("DNA") printing device.

In embodiments, the data streams can comprise discrete packets of data transmitted non-continuously.

In embodiments, the first data stream may originate from one or more user electronic device or computer.

In embodiments, the digital production management platform may be configured to determine a buffer size for the second data stream based at least in part upon any of a production device speed, an object design file size, a duration of a period of time to establish an initial connection with a production device, or a production device download speed.

In embodiments, the portions of the object design file may be transmitted as encrypted files.

In embodiments, the digital production management platform may be configured to transmit a portion of the object design file to at least one of the one or more production devices only when no other portion of the object design file is stored in computer-readable memory of the digital production device.

In embodiments, the second data stream can transmit production instructions, such as production device settings, production quantity, production material requirements, production tolerance requirements, and/or production timetable, to name a few.

In embodiments, the feedback data stream can be transmitted from any of one or more production device, sensor device, reader device, computer, user electronic device, and/or database.

In embodiments, the digital production management platform may be configured to receive an object design file that is not a non-three-dimensional printable file and convert it automatically into a three-dimensional printable file. A non-three-dimensional printable file may be a computer aided design ("CAD") file.

In embodiments, the digital production management platform may be configured to generate a digital watermark to be inserted into the object design file.

In embodiments, the digital production management platform may be configured to insert a physical watermark design into the object design file.

In embodiments, the physical watermark may comprise any of raised features, indentations, or combinations thereof.

In embodiments, the physical watermark may be designed to protect against unauthorized copying of a produced object.

In embodiments, the system for digital production can further comprise a reading device configured to detect physical design elements of a three-dimensional object.

In embodiments, a reading device may be configured to authenticate an object after its production by comparing detected physical design elements to expected physical design elements. In embodiments, the physical design elements may be compared based at least in part upon any of design structure, material, or surface features.

In embodiments, a reading device may be configured to detect a proprietary physical watermark inserted by the production management platform or an owner of an object design file.

In embodiments, the system for digital production can further comprise a sensor device configured to detect an environmental condition. In embodiments, environmental conditions may be any of seismic activity, temperature, humidity, or pollution.

In embodiments, feedback data can include at least any of production duration, production device connection quality, production errors, authenticity data, environmental conditions, or production device settings.

In embodiments, a system for digital production can include a plurality of digital production devices for manufacturing three-dimensional objects and a digital production management platform comprising at least one or more processor and non-transitory computer-readable memory. The digital production management platform can be connected to at least some of the plurality of digital production devices via a data network, such as the Internet. The digital production management platform may be configured to receive a first data stream comprising an object design file. The platform may be configured to transmit a second data stream to at least one of the one or more production devices, the second data stream comprising at least portions of an object design file. The platform may be further configured to receive a feedback data stream from the one or more production devices comprising at least digital production status data.

In embodiments, the digital production system may receive and/or transmit data along the first data stream, the second data stream, and/or the feedback data stream.

In embodiments, the production management platform may be configured to convert data from the feedback data streams from a plurality of production devices into a common format.

In embodiments, the production management platform may perform the steps of receiving, at the production management platform from one or more computers, an object design file; determining, by the production management platform, compatibility of the object design file with one or more production devices; determining, by the production management platform, suitable production device settings for a selected production device; transmitting, from the production management platform to the selected production device, the determined production device settings; and transmitting, from the production management platform to the selected production device, at least portions of the processed object design file.

In embodiments, the production management platform may further perform the step of processing, by the production management platform, the object design file to ensure compatibility with the selected production device.

In embodiments, the production management platform may further perform the step of processing, by the production management platform, the object design file to reduce the likelihood of production errors.

In embodiments, processing the object design file can include identifying, by the production management platform, object design characteristics; ascertaining, from a database of object design characteristics, similar historical object designs; and accessing, from the database of object design characteristics, historical production data from the production of the similar historical object designs.

In embodiments, processing the object design file can further include modifying the object design file based at least in part upon the historical production data.

In embodiments, processing the object design file can further include modifying the object design file based at least in part upon external data accessed or received from one or more databases.

In embodiments, processing the object design file can further include modifying the object design file based at least in part upon additional user input, via an input device and/or via a user interface of downloadable software or a website.

In embodiments, the production management platform may further perform the step of storing, by the production management platform in one or more databases, object design file data comprising the object design file, any modifications performed thereto through processing, and production feedback data received from the feedback data stream.

BRIEF DESCRIPTION OF THE DRAWINGS

Exemplary embodiments of the present invention will be described with references to the accompanying figures, wherein:

FIG. 6C (600) illustrates the Production Data Monitoring (PDM) Module method of delivering the Object Production File from the System Platform to the Production Device and of remotely monitoring production of the subsequent object in order to detect unauthorized actions.

FIG. 10 (1000) illustrates the Sensor Device that is used to monitor the production of Object(s) by measuring internal and external device-specific and environment-specific properties.

FIG. 11 (1100) is a legend of elements in the other figures.

DETAILED DESCRIPTION

Figure 1:
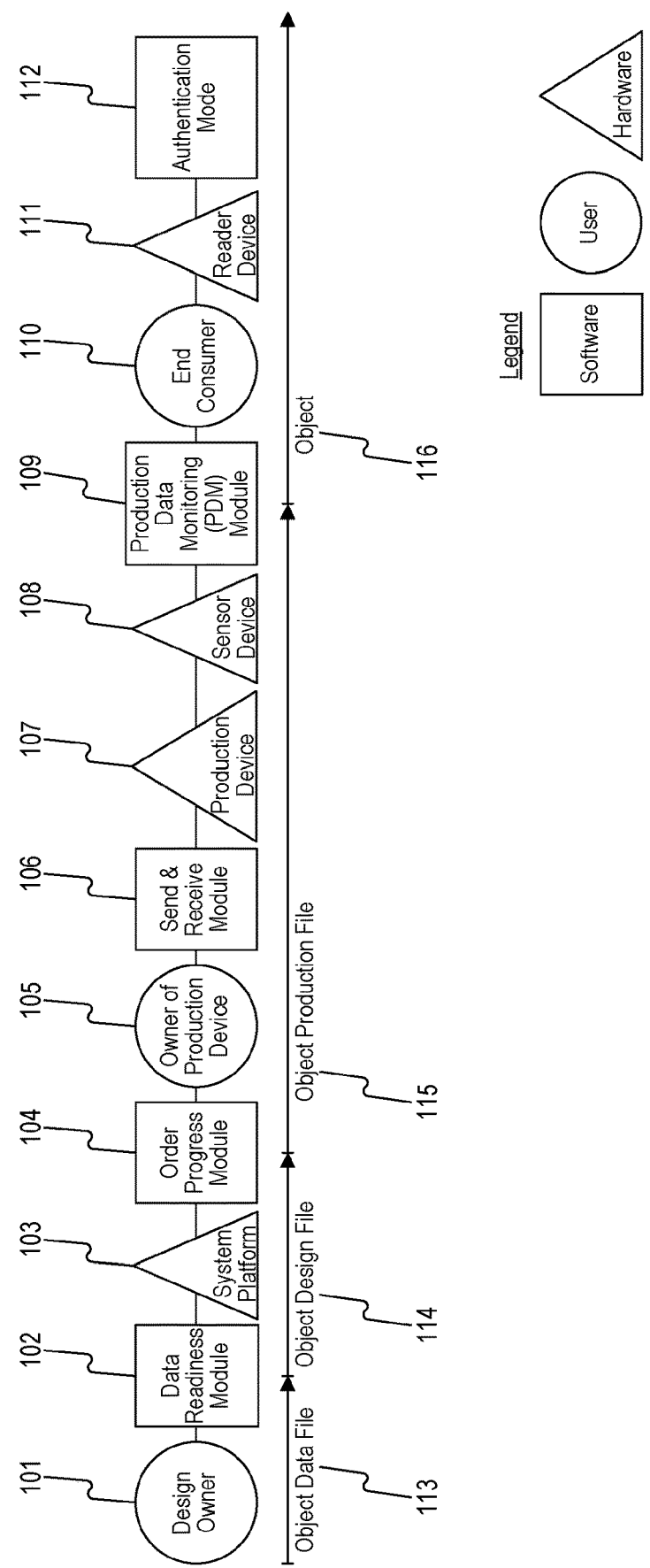
FIG. 1 (100) illustrates the Overall Flow of the Object File and the Object between the original Design Owner(s) and the End Consumer(s) of the object.

The present invention generally relates to systems, methods, and program products for managing digital production from one or more production devices with one or more sources providing inputs of production designs and/or production options.

The disclosed invention discloses novel features related to digital manufacturing and/or other digital production. Digital manufacturing includes, but is not limited to additive manufacturing, three-dimensional ("3-D") printing, computer numerical control ("CNC") milling or machining, and any other kind of production involving production of a solid object, of any shape, from a digital model (file or files). Digital production is generally achieved using an additive process, where successive layers of material are laid down in different shapes, and in some cases, a subtractive process, where layers are removed. A variety of digital production devices may perform such digital production operations (e.g., 3-D printers, milling machines, and/or computer-controlled lathes, to name a few).

Although discussed with respect to physical output, in embodiments, the digital production systems and methods described herein can be applied to non-physical output or microscopic output, such as the production of DNA structures and other chemical or biological compositions of non-naturally occurring forms by production devices capable of producing such output. In such cases, applications of the invention can include, for instance, facilitation, monitoring, and/or protection of the production of medicines and/or other goods in the home or in locations close to patients in the same way the invention could be used, for instance, to facilitate, monitor and/or protect the production of physical objects in homes and workshops.

The invention discloses a digital production management platform, which may be operatively connected (e.g., through a data network such as the Internet) to one or more production device, to one or more computer, to one or more user electronic device (e.g., a smart phone, PDA, tablet computer, to name a few), to one or more other device (e.g., a reader device or sensor device, to name a few), and/or to one or more database. The digital production management platform can comprise at least one or more processor and non-transitory computer-readable memory. The platform can be distributed on multiple processors and/or multiple computers. The platform may be created through software distributed to the one or more computers participating in a digital production system. In embodiments, the platform can include one or more centralized servers. In embodiments, the platform can be one or more servers accessed through downloadable software or websites.

The digital production management platform can receive or be configured to receive input data streams that include one or more object design files. The platform can receive or be configured to receive additional input data streams, which may contain data related to digital production options. The platform can also receive or be configured to receive feedback data streams, which may originate from production devices, reader devices, sensor devices, and/or computers or other user electronic devices associated with digital production devices or their operators, to name a few. The platform can communicate, which may include transmitting data, to at least any of the foregoing entities or devices. Accordingly, the platform can transmit one or more data streams to one or more production devices, which one or more data streams can comprise any of an object design file, portions of an object design file, digital production instructions, digital production criteria or guidelines (e.g., deadline information), to name a few. In embodiments, the platform can relay, route, and/or provide routing instructions to coordinate data streams or transmissions among participants or devices in the system.

Feedback data may be based at least in part upon historical data, test data, and/or data provided from external sources or repositories, any of which may be stored in and/or accessed from one or more database. As described herein, a digital production management platform can receive feedback data, which can include digital production status data, production analysis data, such as production quality data, to name a few. For example, feedback data from internal sensors for a 3-D printer may indicate print head position, print head temperature, bed temperature, and/or laser temperature, to name a few. Feedback data may be measured, processed and/or derived by the platform at least in part from incoming data. For example, the platform may determine a production device's response time or processing time for commands transmitted by the platform to the production device. The platform can receive feedback data from external sensors, which may detect seismic or other environmental conditions, material quality, to name a few. Feedback from reading devices, scanners, and/or sensors, can include data about production quality. Other feedback data may be received from external databases, such as databases of environmental conditions. Environmental conditions can include meteorological conditions, such as humidity, ambient temperature, and/or wind speed, and/or geological conditions, such as seismic measurements, to name a few. Various exemplary instances of the receipt of and use of feedback data by the platform are discussed herein.

The invention provides for secure transmission of object design files, including receipt and transmission of object design files from designers and intellectual property owners to a manufacturing device by method of streaming data without storing data on an intermediary device. The invention also allows for secure data transmission by sending only partial object design files for processing, ensuring that the object design file portion is not copied or used for any other, unauthorized use. Object design files include, but are not limited to, any kind of data file that contains information for digital production. Instead of an object design file, the invention could also use an object data file, an object production file, or any other file representing some digital manifestation of part of all of a production (3-D) object. Object data file and object design file are used as separate terms below, but the nomenclature of such files can overlap in various embodiments of the invention.

The invention is compatible with standards and file types of the current art in digital production, such, but not limited to, the Additive Manufacturing File Format (AMF) and Standard Tessellation Language (STL), for example. The invention can be adapted to other object design and object data files standards, and also discloses features that can serve as the basis for future file standards.

The invention also provides for ensuring the partial object design file is removed in its entirety from the device before sending the next portion for further processing. In embodiments, a digital production management platform may only transmit a successive portion of an object design file to a production device after detecting the absence of a prior portion or any portion of the object design file on the production device or after receiving a confirmation of removal of a prior portion or all stored portions of the object design file.

Standard encryption protocols can be used as part of the invention. The invention also provides for establishing secure remote connections that are protected from any outside interference and maintaining constant traffic flow through the Internet. This can be achieved by preventing other software on the same device or network from accessing the Internet when speeds fall under a pre-determined minimum level.

The invention also provides a multi-use database where it creates a history for each object design file. History information, includes, but is not limited to, production data, materials used, environmental factors, machine states at time of production, post-production manipulation, and transportation information. The invention also provides automatic identification of image ontology or other metadata and then integrates this information into an ontological mapping of the object which is then stored as part of the object's history. Such object information (general object design features, corresponding characteristics identified during the creation of the object design file, as well as required object features, additional metadata, including its ontology) can alternatively be entered manually into the database of the invention.

The invention provides for comparing entries in the multi-use database to all new object design files being created in order to determine new object design features more rapidly and with increased specificity. The invention also provides for comparing entries in the multi-use database to all new object design files being created in order to determine whether the design is already registered. The invention can also compare object files with unique digital and/or physical signatures (material and design features integrated into the object design file) to authenticate scanned objects.

The invention also provides for searching of the multi-use database, allowing authorized parties to utilize both design and non-design data criteria associated with the object design file, such as, but not limited to name, designer name, tags, item number, and color. The databases can be secured by encryption or otherwise with unique access codes and access logging for every user. For example, users may access databases and/or software associated with a digital production management platform using an email address, login name, password, pin number, and/or biometric scans (e.g., thumbprint), to name a few. Access tokens may be employed as part of a secure access system.

The invention also discloses novel features such as, but not limited to, provisions for converting other file types into object design files compatible with the invention, integrating data manufacturing practices (such as material and color) into the object design file, and validating the object design file as capable of supporting the intended produced object.

The invention also provides for object resizing, reconfiguration and optimization. It allows for dynamic changes and assessment and characterization of actual object features such as compression strength and other physical characteristics. The invention also provides for slicing of the object design file into smaller files that can produce parts of an object on their own. The invention allows these processes, and others mentioned herein, to be undertaken in a continuous process, which contrasts to the current fragmented ecosystem, which requires users to install and use multiple separate products in order to complete similar objectives. In embodiments, all digital production management may be performed via a single digital production management platform, which can manage, centralize, and/or streamline a plurality of digital production steps.

The invention also provides object design file owners or others authorized by the design file owners, up-to-date information regarding status of designs and/or production. The database can be queried for all the following features, among others: [0081] Information of each download [0082] Payment details for each download [0083] Status of each print of pieces uploaded by them [0084] Authentications applied (to pieces found to be accurate) [0085] Ability to edit previously entered information [0086] Potential intellectual property breach Such information can be provided to object design file owners or others authorized by the design file owners, and authentication, validation and query rights can be so distributed. While the first two in the list would typically be the only information distributed to the non-design owners, this system can be customized as desired.

On the customer/payee side, the invention can provide object design file purchasers with the following features, among other info, also queried from a database: [0089] Status of each purchase [0090] Invoice [0091] Payment receipt Order History [0093] Full Traceability Documentation, including technical information about design, strength and composition The invention also allows for amendment to access codes, security, payment, pricing, and any other settings that may affect the object design file.

The invention also provides for a dynamic updating and monitoring of production, so that production parameters can be changed or production can be halted, e.g., based on error parameters. The invention allows for monitoring of environmental and other local factors during the production process and report the same to the database created (see database description above). It also allows for monitoring of production and machine state information during the production process and report the same to the database created under point (see database description above). The reported information is utilized to make decisions on production and ensure authorized, proper production occurs.

The invention provides for unique and novel means of authentication that allow for non-restrictive means of controlling intellectual property and for crediting and administering intellectual property rights. The invention includes the ability to identify any owners or contributors to the object design file as well as their contribution to the creation and distribution thereof in order to associate a full hierarchy of ownership to the object design files. Accordingly, a digital production management platform in accordance with the present invention may be used to allocate intellectual property or other ownership rights and/or determine shares of payment.

The invention also allows for deployment of a test object design file that can be used before purchase to influence this decision. For authentication means within the produced object itself, the invention can identify and alter layer material composition of the object within the required limits of object features to provide additional security. This includes inserting unique identifiers employing techniques such as watermarking or steganography for each of the layers created or some of the layers. Such watermarks, which cannot be copied by external parties, may also be used to cloak the object and thus make it impossible to scan the entire object. This could disable any attempt to copy the functional object. A digital production management platform of the present invention may insert a watermark that cannot be detected or easily detected without pre-existing knowledge of where or how to detect the watermark. Such a watermark may be inserted at an atypical angle or position in an object, which may shield it from non-specialized scanning devices or may make a scan of a sufficient resolution unattainable. Accordingly, only authorized scanning devices may be provided with instructions for detecting a watermark.

While recording information regarding the machine state, local and environmental factors during production process, the invention can compare this information to expected states over the same time period in order to create a library of expected production states and create a library of produced objects qualities The invention can also create a final, unique, encrypted authenticating layer, which is only issued if all information received is as expected. Note that creation of any of such authentication layer can be done dynamically, as the production is carried out.

The invention also includes specific hardware. Such hardware can scan objects and identify high-fidelity object features (some invisible to human senses) that have been integrated into the object design file for purposes of authentication, using a unique command scheme specific to the user to extract. Additional hardware monitors environmental (e.g., heat, humidity, motion, tremors) and other local factors to dynamically report these parameters. Object purchasers may be install such hardware in their production facility, or in the production machines themselves to provide accurate production monitoring data.

Ancillary Applications for a Digital Production Management Platform

The invention provides for one or more applications that may be implemented on top of or integrated as part of a system for management of digital production devices. Such a system can comprise a digital production management platform, which may be configured for remote monitoring and control of digital production operations. The digital production management platform may implement and/or integrate one or more ancillary applications into the digital production process. The digital management platform may comprise one or more computers or computer systems, which may be physically separated and/or owned by separate entities but connected through a data network. In embodiments, software or a website interface (e.g., accessible at a URL) may be employed to enable computers to participate in a digital production management platform (e.g., by uploading design files, providing additional digital production data, and/or receiving digital production status or feedback data, to name a few). The digital production management platform may further comprise central servers to route, process, and/or store data.

Ancillary applications for digital production may provide at least distribution management of digitally produced objects or object design files, production management, production reporting, and/or digital production analysis. To those ends, ancillary applications for distribution management can include payment gateways, digital format conversion, production restrictions, design access, export restriction filtering, and/or bidding platforms, to name a few. Ancillary applications for production management can perform slicing tool selection, crowdsourcing digital production device settings, submitting additional data, automatic alerts (e.g., related to feedstock supply), queue and/or array management, bed layout, and/or floor management, to name a few. Ancillary applications for production reporting can include watertight checking, printer compatibility evaluation, photogrammetry, remote quality assurance, certification, and/or indexing, to name a few. Ancillary applications for production analysis can involve customer interfaces, production failure reporting, management information system alerts, order tracking, post-production data collection, warranty management, and/or read and/or write steganography, to name a few.

These applications may be implemented by computer code running on one or more processor associated with a digital production management platform, as discussed herein. The applications may receive data from one or more input data stream from remote or local sources (e.g., computers associated with object design owners, production devices, reading devices, sensors, to name a few). The applications may output and/or transmit data to a digital production device and/or one or more other computers or devices. In embodiments, input and/or output data streams may comprise packets of data or other discrete transmission and not necessarily a continuous stream of data. Data streams may be received and/or transmitted via a data network, such as the Internet, via an intranet, via other wireless connections (e.g., Bluetooth, Wi-Fi, digital cellular, PCS, CDPD, GPRS, CDMA2000, Ev-DO, HSPA, UMTS, or satellite, to name a few), via wired connections (e.g., POTS (telephone), fiber (such as Hybrid Fiber Coaxial), or xDSL, to name a few), and/or via direct upload (e.g., from a disc, hard drive, or USB drive). Interface hardware and/or software may comprise Ethernet interfaces (e.g., supporting a TCP/IP stack), X.25 interfaces, Ti interfaces, and/or antennas, to name a few.

In embodiments, a digital production management platform can access one or more external databases, which may include any data relating to digital production, such as material databases or production device settings, to name a few. Such external databases may be provided by production device manufacturers, production device retailers, online forums (e.g., 3-D printing blogs), production device owners or operators, industry groups, and/or standards organizations, to name a few.

Payment gateways may be integrated into the platform to enable the automatic calculation of the cost of production as well as handling of the billing, payment, and/or invoicing process for the end customer so that the end customer may proceed to production of the object without having to leave the production management platform.

Ancillary applications for digital format conversion can process an object file or other design file and convert it into different formats, eliminating the need for a standardized input format or file type and enabling inputs from a multitude of software programs or systems (e.g., various CAD software). A digital formatting application running on one or more computers can receive an input design file from the input data stream. The file may be stored in non-transitory computer-readable memory comprising one or more databases. The one or more computers, using computer code comprising at least part of the formatting application, can identify the file type and determine compatibility with one or more digital production devices. Where there is a lack of compatibility or further compatibility or optimization is desired or required, the one or more computers may convert the design file into another file type and/or otherwise process the design file to produce a file with the proper production device compatibility. That new design file (e.g., an object data file) may be transmitted to one or more production devices for manufacturing. In embodiments, the determination to convert to a different digital format may be based upon user input (e.g., using a keyboard or other input device), pre-defined compatibility rules, knowledge of the destination or intended use, and/or computer analysis of the design file, object characteristics, and/or production device properties.

Digital format conversion applications can also include the conversion of feedback data received from digital production devices, for example, by automatically identifying what device or purpose the data is to be used for based on type of object produced, data use requirement, historical data use, to name a few. For example, the output of different digital production devices may be converted into a standardized format that can be read or input into other software platforms, such as enterprise resource planning software, or to better understand the output of various printers. Digital format conversion processes can include a comparison of the original file or data and the output file or data in order to verify integrity of the conversion process.

Ancillary applications for production or print restrictions can restrict the production of objects or can direct the production of objects to certain production devices or facilities based upon various criteria. Processes for print restrictions can involve identifying, by one or more computers, production criteria as well as production device or facility characteristics. Production criteria can include the type of object being produced, the quantity being produced, the timeframe, the desired cost, and/or customer (or other user) information and/or affiliations, to name a few. Production device or facility characteristics can include location characteristics, such as geographic location, certification (e.g., for compliance with International Organization for Standardization ("ISO") standards, or certification from a particular company or industry group), membership in unions, trade groups, or other organizations, type of production device, training, certification of membership of production device manager or operator, and/or government approval or restrictions. Production device or facility characteristics can also include current conditions, such as production device availability, production queue, and/or anticipated production time, to name a few. Knowledge of an intended destination for data may be used to determine such location characteristics automatically. Such characteristics and/or production criteria may be accessed from one or more databases (e.g., of production device characteristics), from production device operators, and/or from production devices. Processes for print restrictions may then entail comparison, by one or more computers, of the criteria and characteristics required or requested by design owners and those available at production facilities or devices. According to the comparison results, the digital production management platform may permit the transfer of an object design file to a digital production device, may direct the design file to a particular facility or production device, may block production, may alter the design, and/or may generate and/or issue separate or additional instructions (e.g., to a production device or a production device operator), to name a few. In embodiments, the actions that may be taken can be influenced by success, failure, or other status reports of previous production attempts, which may be used to form rules for future production attempts. For example, if an object failed to print on a certain type of 3-D printer, the design may be edited during future printing attempts or may be blocked from printing on that same type of 3-D printer.

Ancillary applications for design access represent the application of the hierarchy system previously mentioned. The system can provide access to designs, such as those submitted by third parties, while ensuring that that third parties and/or any other interested parties are informed and/or compensated for the use of the design, if required. The parties accessing such designs may find an object or object design file in a variety of ways, which can include searches by keywords, two-dimensional images, categories, owner or designer information, identification numbers, and/or three-dimensional scans of associated or similar objects, to name a few.

Ancillary applications for export restriction filtering may evaluate designs to determine whether they fall within government export controls. The digital production management platform may index object design files and store their characteristics (e.g., physical characteristics) and/or any export restrictions in one or more databases. The platform may then compare files from the input data stream to the stored characteristics to determine whether similar objects (e.g., similar physical shape) are export controlled. In embodiments, metadata may be provided by a user to indicate the type of object in the input data stream, which metadata may be compared against public law codes to determine whether there are any export restrictions. If so, the digital production management platform may provide an object design owner or a buyer of an object design file with the appropriate registrations and/or paperwork, which may be digital, and the platform may provide guidance (e.g., step-by-step instructions) for completing such paperwork.

Ancillary applications for bidding platforms may provide a marketplace or auction platform for object design owners to sell or license their designs or design files or for object design owners to bid or pay for use of a digital production device. In the latter case object design owners can bid on the ability to produce their objects using any of a plurality of crowdsourced production devices, which may be listed by the bidding platform. Accordingly, the bidding platform may store in one or more databases a list of productions devices, which may include their characteristics and a database identifier. In embodiments, the bidding platform may add production devices to the database automatically as those devices are used in connection with the digital production management platform. The bidding platform may select production devices to list based upon availability of the production device and/or current production queue, to name a few. In embodiments, production device owners may add their device to the list. The bidding platform may provide an interface for users to input criteria to execute bidding on their behalf automatically. The platform may generate one or more rules based upon the input criteria and use the rules to control the automatic bidding for the corresponding users. The bidding platform may provide an alternative method for directing production tasks to production devices. Data may be collected and/or analyzed regarding the types of production devices used and their degree of use (e.g., tracking the most used 3-D printers). Data may also be collected and/or analyzed regarding the types of objects being printed, as well as object design owner satisfaction, print speed, and other parameters. Such data may be used to improve the assignment of digital production tasks in a network of digital production devices.

Production management applications can include ancillary applications for slicing tool selection. The digital production management platform may select and/or optimize selection of a slicing tool, which selection may be based upon historical data regarding similar objects and/or any feedback data from their production. Accordingly, object characteristics (e.g., geometry), slicing tool usage data (e.g., which slicing tool was used), and/or production device feedback data (e.g., whether there were any production errors, whether re-slicing was required, whether the production was unsatisfactory, to name a few) may be stored in one or more databases. Computer code running on one or more processors may evaluate the instant object design file and compare it to similar design files or similar object designs in the database in order to determine a suitable slicing tool or the optimal slicing tool.

Ancillary applications for production device (e.g., printer) settings may entail automatic generation of appropriate production device settings based on publically available data and/or historically generated data regarding the production device model stored in one or more databases. Historically generated data can include historical data the production management platform has logged relating to the correct settings for various production device models, as well as historical data the production management platform has logged on the modification to the correct settings for a given production device model, e.g., based on the type of object being produced. In this regard, historical production device feedback data may be stored along with the production device model and settings. Specialized computer code may access the relevant databases and determine appropriate production device settings. In addition to the production device model information, the computer code may use as inputs at least the type of object being produced and/or any environmental conditions (e.g., ambient temperature) that may affect production. Production device settings can thus be crowdsourced from different databases of printer settings that can be accessed through a data network. In embodiments, a production device owner or operator may input the production device model information into a software application (e.g., a website user interface or downloadable software) associated with the production management platform in order to receive or automatically configure the printer with the correct settings. The platform can thus enable a streamlined production process where a production device owner need only input the production device data (even this data may be uploaded automatically upon connecting the production device to a data network) as well as an object design file, from which the platform can determine suitable settings, which may be implemented via automated remote control of the production device.

In an exemplary embodiment, the digital production management platform is tasked with 3-D printing a design of a doorknob on a particular 3-D printer model. In order for the invention to specify the correct settings for the printer, such as correct diameter of injection head, and for the object, such as the correct slicing size (which may be the number of layers into which the object design is divided for printing and which may depend on the particular 3-D printer), the platform can first access and analyze publically available information, e.g., from a public database of printer settings, from a website associated with the production device manufacturer, from retailer websites, and/or from 3-D printing blogs, to name a few. The platform may then access and analyze previously generated and stored historical data regarding the optimal settings for the particular production device when making doorknobs or door handles. Those settings may be transmitted to the 3-D printer operator and/or may be implemented directly at the 3-D printer.

Ancillary applications for additional data submission may access additional information related to production of a specific object type or design file type or use of a particular production device. The platform may obtain or predict (e.g., based on historical data from the production of similar objects or based on information about the client or user, such as industry or field of work, to name a few) the type of production device to use. The platform may then identify the information required by that production device. The production device required information may be obtained via a user's input or from previous productions, among others. From there the platform can compare the input object design file, which may be uploaded by the user, to the production device characteristics, which may be accessed from one or more databases, in order to determine whether additional information is required. For example, if the production device is a full-color production device and the object design file is black and white, color information may be required. If the production device performs automatic post-processing, the additional information may relate to the type of post processing that may be required. The platform may then predict the required information (e.g., based on previous productions, derived from similar previous productions, or input from the manufacturer, to name a few). The platform may then transmit the predicted information to the user for verification or require manual input from the user during an order workflow. The platform may communicate any additional information to the production device or the device manager in an understandable form.

Ancillary applications for automatic feedstock alerts can provide notifications to production device systems, owners, and/or operators when the production feedstock is low. In addition to alerts, the platform may provide automatic feedstock fulfillment. Feedstock can be 3-D printer resin or raw printing material. For production devices used only in conjunction with the digital production management platform, the platform can track production and estimate feedstock usage. Feedstock inventory may be input into one or more databases and/or updated periodically. Based upon the starting feedstock quantity and the amount of production, a current inventory estimate may be computed. Inventory updates can allow feedstock notifications even for production devices that are not used exclusively with the production management platform. A production device owner may also input or a production device may automatically submit data on production jobs not performed through the platform, which may be used to estimate feedstock usage. The platform can generate and/or transmit alerts to a production device owner or operator when feedstock is low. The platform can provide an automatic fulfillment service by ordering feedstock with enough lead time for the feedstock to be ready when the production device runs out. In this regard, the platform may consider upcoming production tasks (e.g., if a large job is scheduled) and order sufficient feedstock accordingly. If the feedstock alert or ordering system performs incorrectly (e.g., provides alerts when adequate feedstock is still available, does not provide alerts when feedstock is depleted, or orders incorrect quantities or materials, to name a few) and as a result the production device owner or operator interferes, the platform can track the errors and any modifications made and utilize that information to improve its future operation by employing programming for machine learning.

Ancillary applications for queue or array management may control digital production workflow. In a system with a plurality of networked production devices (e.g., crowdsourced through the digital production management platform of the current invention), the platform can use predefined rules as well as rules adapted over time to select automatically the optimal production device for a particular job. A queue or array management system can manage the assignment of work (e.g., directing the destination of the input object design file data stream) to a crowdsourced group of production devices or device operators. A queue management system may consider a production device's cost, a production device's capable quality, a production device's estimated production timing (e.g., considering the production device's ability as well as the current production queue), a level of quality required for the job, a desired cost range, and/or a required time range, to name a few. Such a system can utilize artificial intelligence programming, including machine learning and/or intelligent system decision-making. The system can utilize feedback from the digital production devices or operators (e.g., production speed, customer satisfaction) to improve production device selections in the future.

Ancillary applications for bed layout can perform and/or provide instructions for the automatic adjustment of the object location within a production device. The platform can calculate and/or adjust such positioning in order to achieve the best possible and most efficient production and material use. The platform may perform such positioning or instructions therefor in relation to other objects that may be present (e.g., object produced at the same time in the same production device or objects previously produced that have not yet been removed from the production device).

Ancillary applications for floor management can provide management of the flow of a production object through a production facility more accurately and efficiently based on data received from the production device, providing additional data to the production device or production device owner, and/or amending the object design to ensure its traceability. For example, data received from the production device may be generated into alerts to indicate that production is delayed or that the object has been produced. Additional information that may be provided to a production device or device owner may, for example, indicate how to post process an object or identify storage locations based on material used for production. Amending the object design to enable traceability can include inserting identifiers into or onto the object, e.g., through steganography, which link the physical object to digital information about the object stored in one or more database. Such digital information can include shipping information.

Ancillary applications for watertight checking can provide evaluation of whether a design is manifold and/or any corrections needed to achieve a manifold design. Specialized software running on one or more processors of the digital production management platform can import the object design file and perform the required evaluation. In embodiments, the platform may determine whether any metadata associated with the design file indicates that the design has already been evaluated and certified as manifold.

Ancillary applications for production device compatibility can verify whether an object design file can be produced on a specific production device. The platform can access a database of historical production data to determine whether the same or similar object design file types experienced production issues on similar production devices. An exemplary production issue may be a physical void in a certain area of the object. Such issues may be detected using digital design file checking methods. The platform can automatically make any needed corrections based upon historical data of how past users manually fixed the compatibility issues. The platform can flag a production job for human review (e.g., to verify printability of a 3-D object) and/or provide an alert that review is needed before production proceeds.

Ancillary applications for photogrammetry can enable the production of an object from unrelated data sets that may otherwise be judged not to include the information required to produce such an object. For instance, the digital production management platform can have the ability to accept file types that represent two dimensional data. The platform can then use multiple such images to produce a single three dimensional design, which can then be forwarded automatically to the production machine. The platform may also use such two-dimensional data to identify three-dimensional or other data from within its own or third-party databases and use this same data to create one or more designs with sufficient instructions for a production device to execute.

Ancillary applications for remote quality assurance can be employed to detect and/or determine whether an object has been produced correctly. The production management platform can compare feedback data received from the production device to expected feedback data (e.g., generated from historical data, test data from labs, and/or by machine learning of a variety of data sources, such as similar but not identical prints, meteorological data, and/or external sensor data, to name a few) to determine whether the production was executed correctly. Feedback data can include sensor data. Specialized sensors may be employed to make accurate measurements for comparison to the design or to analyze the physical object for satisfaction of acceptable tolerances. The platform may determine in real time whether corrective action is required and/or may take such corrective action. The platform can determine a confidence interval produced by the feedback data and whether such confidence level is sufficient, potentially insuring the liability created by the production base on this result. For example, warranty parameters (e.g., duration of warranty, scope of coverage) may be generated based upon quality assurance or other feedback data.

Ancillary applications for certification can provide integrated certification of the object based on the confidence produced through remote quality assurance processes and/or from analysis of the design. The platform can identify required object characteristics and design intention (e.g., strength bearing on certain axes) based upon manual input and/or computer vision identification of the object in conjunction with databases of required characteristics for such an object, data on similar previous objects produced, and/or information about the client or the production device manager etc. (such as their industry). The platform may then employ finite element analysis techniques to determine whether the object design matches the identified required characteristics. The platform may edit the design, if permitted, to correct or provide any missing characteristics. The platform may monitor production, such as through remote quality assurance, to ensure that the production of the object actually produces such characteristics. The platform can then provide certification for the object from certifying agencies based on the foregoing evaluation of the object.

Ancillary applications for indexing can use computer vision (e.g., relation of voxels) to categorize objects, understand object characteristics, and/or save object characteristics in one or more databases. Object characteristics can include a class or general type of an object (e.g., a mug) or a required orientation in the production device, to name a few. The platform may modify characteristics, such as the orientation, as may be required for device compatibility or better production. Indexing may be used to associate design objects to historical production data for similar objects, such as the production devices that produced them and/or any errors that occurred or corrections that were needed.

Ancillary applications for production analysis can include customer interfaces to relay information known about an object. Such information may be determined automatically through the processes described herein or may have been provided manually and stored in one or more database throughout the production process. Information about an object may be provided in a variety of formats, including graphical representations. Information can include design modification, production status, and/or production quality, to name a few. The platform can provide such information to a user through downloadable software designed to integrate with the production management platform, website interfaces, email alerts, smart phone application alerts or push notifications, SMS alerts, and/or telephone calls, which may be generated automatically, to name a few.

Ancillary applications for failure reporting can provide alerts, notifications, and or reports of varying detail regarding errors during a digital production process. Errors may be determined at the digital production management platform, e.g., using data provided by a production device, reader device, other sensor, or computer or electronic device associated with a production device or its operator. In embodiments, errors may be determined by the production device itself, a reader device, and/or a sensor device, to name a few. The platform can generate an alert, notification, and/or report based upon the error data. The platform can transmit such alerts, notifications, or reports to a user electronic device (e.g., a computer, tablet computer, smart phone, telephone, mobile phone, PDA, TV, gaming console, to name a few) via email, text message phone call, and/or other communication (e.g., using the Internet or other data or messaging network). In embodiments, failure reports can be accessed via downloadable software or a website. In embodiments, failure reports may contain options related to continuing or stopping production or making adjustments to the design or to the production settings.

Ancillary applications for a management information system may be implemented by the production management platform to receive, translate, and/or store information relating to an object's production. The platform can receive and stored all relevant data (feedback data from production devices, input from production device owners, input from design owners, etc.). For example, the platform can receive and store object characteristics, design data (including any modifications), production data (including status updates and any errors), to name a few. The platform can translate the received data into a common operable language before storing the data, e.g., on a central server. Such data may be accessed by the platform and/or used as input to machine learning algorithms, as discussed herein. In embodiments, users, using one or more computers, may query the databases of the management information system to determine desired information. By translating the data from disparate sources into an interoperable data stream the platform can facilitate access and use of the data.

Ancillary applications for order tracking can determine production status information and/or provide updates of status information. The production management platform can receive feedback data from a production device indicating the status of production. Production status information may be generated by the platform, such as during the pre-production process (e.g., analyzing design for watertight characteristics). Status information can include which steps of the production process are completed, which steps are on-going, and/or which steps are remaining. In embodiments, as an object is in the process of physical production, a computer-generated representation of the portion already produced can be generated and provided to a user. Such a status representation can be provided in real time or near real time. The quantity can also be tracked for orders where more than one instance of an object are being produced. The platform can also track the locations of produced objects, e.g., within a production facility, and/or shipping status.

Ancillary applications for post-production data collection can receive, aggregate, and/or store data obtained after the production of an object. Such data can include usage information or durability information such as wear and tear of an object, to name a few. The production management platform may provide an interface for manual input of such data and/or may employ sensors (e.g., intelligent embedded sensors inserted during production and transmitting information themselves) to obtain post-production data. Post-production information may be combined with the production data and/or stored separately (e.g., in a separate database) but associated with the other data (e.g., through a common identifier). The platform can thus use the post-production to improve processes such as certification, quality assurance, and/or to improve design or production decisions.

Ancillary applications for warranty management can generate warranty information based upon the object data and predicted usage. The platform can identify estimated usage characteristics (e.g., life span) and provide (directly or through third parties) an insurance product to cover all or a portion of the object.

Ancillary applications for read/write steganography can involve applying physical steganography or watermarks onto 3-D objects in order to encode readable, useful information. During an object design file's pre-production processing, the platform can introduce slight modifications (e.g., small bumps or small indentations on the object's surface) into or onto the object design that do not affect functionality but provide information about the object when detected and read off of the physical object after production. A specialized reader device may allow detection and/or reading of such steganographic physical modifications. For example, this stenographic modification can communicate information about the object's production (e.g., when it was produced, by whom, whether it was produced with authorization from the design owner, whether the object was certified, and/or a serial number, to name a few). The stenographic modification can also indicate information about the design owner (e.g., design owner identity). Stenographic modification can provide a critical tool in protecting proprietary designs and/or policing unauthorized production.

With regards to the present invention, the many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be resorted to as falling within the scope of the invention. It is noted that regarding the elements described in the figures, that more than one element number may be used (for instance, Design Owner(s) is referred to as both 101 and 201), and sometimes even with no element numbers. It should be apparent from the description when the same or similar or equivalent elements are described, even if such figure numbers should differ.

Various elements of the invention are described as modules implemented as software on a general purpose computer and others as hardware elements. In should be apparent that in various embodiments of the invention, implementation of software can be executed by embedded hardware, or vice versa, or in some combination of software and hardware. Also, a computer may take the form of an integrated circuit, printed circuit board, handheld computer, or any general-purpose computer without limitation.

The invention may be implemented by one or more computers or computer systems, embedded circuitry, and/or some combination of these. The software execution may be accomplished through the use of a program storage device readable by the computer and encoding a program of instructions executable by the computer for performing the operations described above. The program storage device may take the form of any memory known in the art or subsequently developed. The program of instructions may be object code, i.e., in binary form that is executable more-or-less directly by the computer; in source code that requires compilation or interpretation before execution; or in some intermediate form such as partially compiled code and/or a collection of executable library files. The precise forms of the program storage device and of the encoding of instructions are immaterial here.

The invention also contemplates use of computer networks known in the art, including but not limited to, intranets such as corporate networks, local and wide area networks, the Internet and the World Wide Web. Wire and wireless communication and communication protocols known is the art, such as, but not limited to, radio, infrared, Bluetooth, Ethernet and other wireless and wired networks, are also contemplated. In the various flowcharts, preferred embodiments of flow direction between elements, looping and iteration are illustrated, but alternative embodiments of these flows are contemplated by the invention. Any elements or other features described in the figures, even if not described in the specification, are supported in the figures so as to be enabling.

The invention discloses novel concepts and implementation, including, but not limited to safe data transfer, remote monitoring, fraud detection, authentication and steganography, peer-to-peer architecture and other aspects of additive manufacturing, subtractive manufacturing, extrusion manufacturing, melting manufacturing, solidification manufacturing, ejection manufacturing, other material printing, and other processes. All references cited here are incorporated in their entirety for all purposes.

Figure 6:
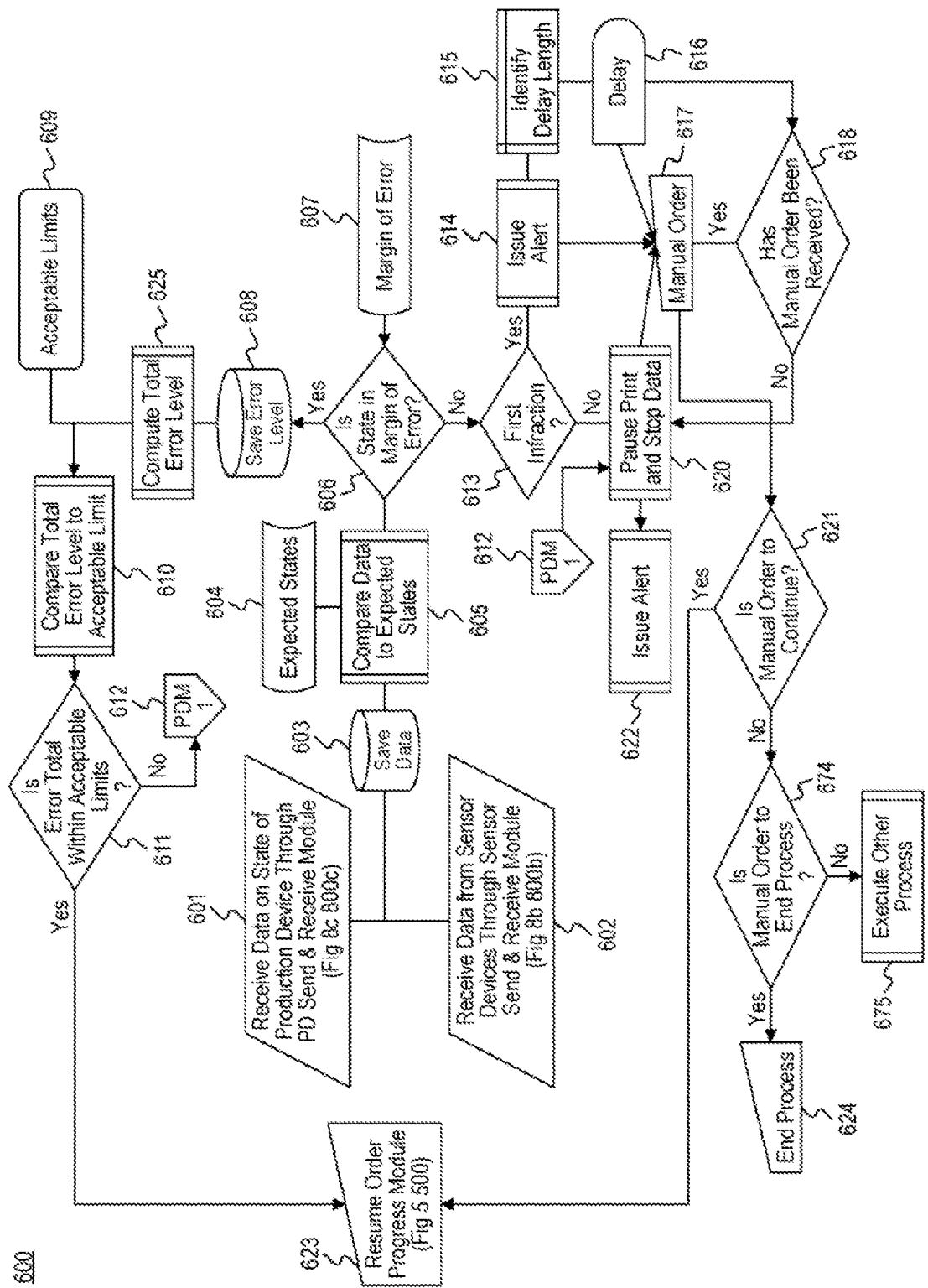
FIG. 6 (600) illustrates the Production Data Monitoring (PDM) Module method of delivering the Object Production File from the System Platform to the Production Device and of remotely monitoring production of the subsequent object in order to detect unauthorized actions.

FIG. 1 100 illustrates a preferred embodiment overall flow of the Object Data File 113 and Object 116 between the original Design Owner(s) 101 and the End Consumer(s) 110 of the Object 116, where the System Platform 103 acts as an intermediary. Note that the Object 116 refers to the actual physical object that is produced and/or printed by the invention. To start the process, the Design Owner(s) 101 supplies the System Platform 103 with the Object Data File(s) 113 it desires to license. This file is taken through the Data Readiness Module 102 (method described in FIGS. 4A and 4B) in order to be modified and converted into a form that is understandable by the Production Device 107. The newly created Object Design File 114 is then stored by the System Platform, or as an alternative, by the Design Owner (s) 101. Users, such as the Production Device Owners 105, can browse for desired Object Data Files 113 by interfacing with the System Platform 103 and then acquire them through the Order Progress Module 104 (method described in FIGS. 5A, 5B, 5C, and 5D). When the Owner of the Production Device decides to utilize the acquired Object Data File to produce the Object, encrypted pieces of the Object Production File are streamed to the Production Device, translated by the Send & Receive Module 106 (method described in FIG. 8), and monitored (e.g., simultaneously) for unauthorized actions and production quality using Sensor Device(s) 108 (method described in FIG. 10) as described in the Production Data Monitoring (PDM) Module 109 (method described in FIGS. 6, 6B, and 6C). Before object production ends, the object is produced with a unique physical signature, confirming its authenticity, which does not affect the function of the object. Finally, when the Object 116 is in the hands of the End Consumer(s) 110, verification that the Object 116 is of the original owner's design and that it was produced to the correct specifications can be achieved through the use of the Reader Device 111 (see FIG. 11), and the Authentication Module 112 (method described in FIG. 7). The Authentication Module calls upon three submodules called the Reader Module, (method described in FIG. 7a), the Scanning Module (method described in FIG. 7b), and the Signature Reading Module (method described in FIG. 7c) each of which performs an important function in securely verifying the object's authenticity.

Figure 2:
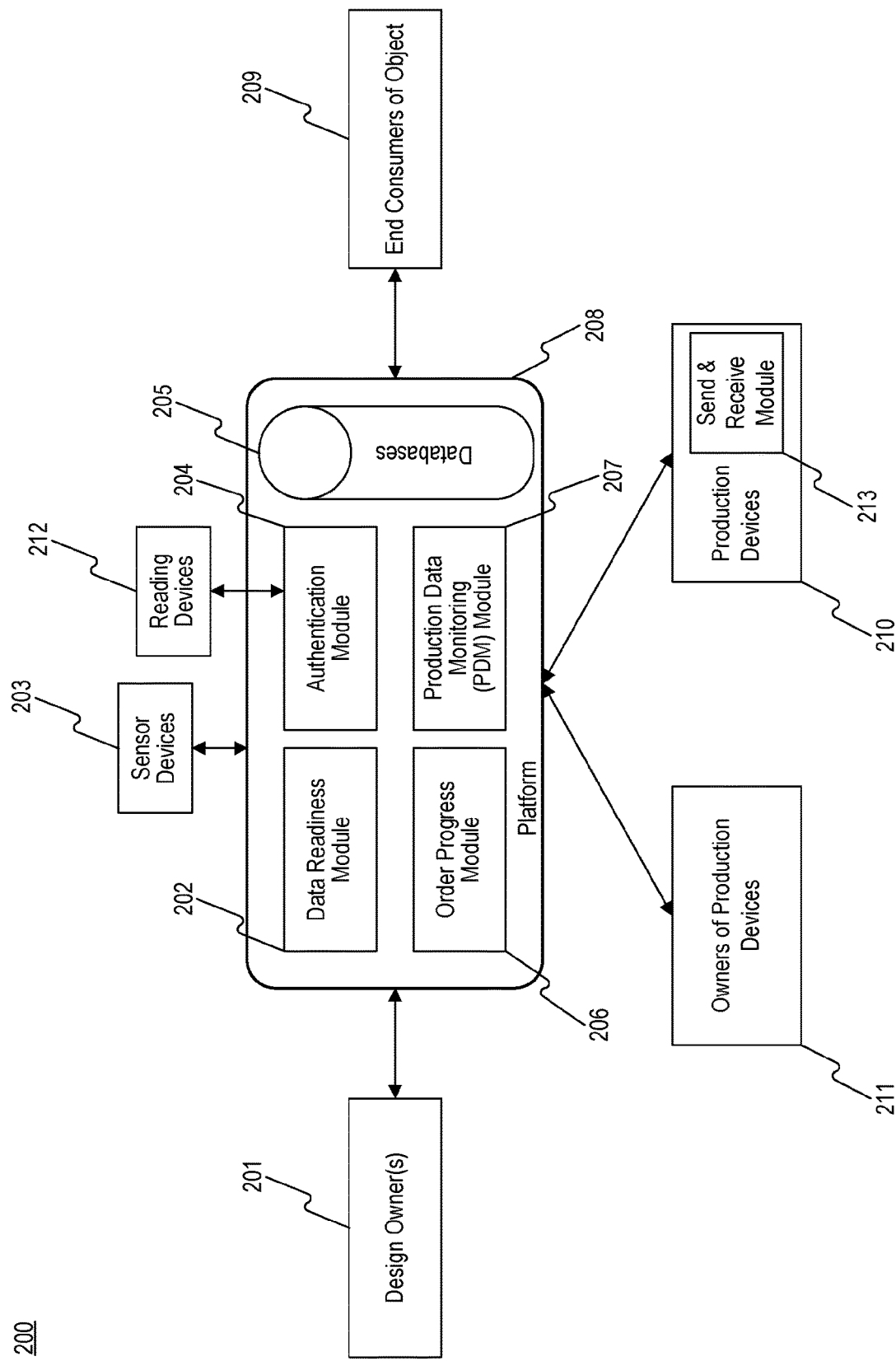
FIG. 2 (200) illustrates the Overall System Architecture where all information is centrally held on the system's Platform.

FIG. 2 200 illustrates a preferred embodiment of the overall view of the system and processes, which emphasizes the system architecture. In this design, all information is centrally held on the System Platform 208 (equal to 103), to which the Design Owner(s) 201 transfers all information. In an alternative embodiment of the same design, the Design Owner may also continue to hold the information. This option is detailed in FIG. 3. The Design Owner(s) 201 could represent one of a multitude of owners contributing to a single Object Design, which the platform records as such in a hierarchy of ownership. All modules (processes) are executed on the System Platform. The Data Readiness Module 202 processes the incoming information, and the Order Progress Module 206 manages and processes order requests issued by Owners of Object Production Devices 211. The resulting production on the Production Devices is achieved by receiving streamed design data from the System Platform. Production is monitored through the Production Data Monitoring (PDM) Module 109/207, which receives production state data from Sensor Devices 203 as well as the Production Device through the Send & Receive Module 213, specifically the Production Device Send & Receive Module (method described in FIG. 8c) and the Sensor Device Send & Receive Module (method described in FIG. 8b), respectively. Meanwhile all generated information is stored in Databases 205, and both Design Owner(s) 201 as well as End Consumers of Objects 209 are informed of key developments in line with the hierarchy of ownership. Any user with a Reader Device 212 may also authenticate the object by using a Reader Device or similar to activate and conduct the Authentication Module 204.

Figure 3:
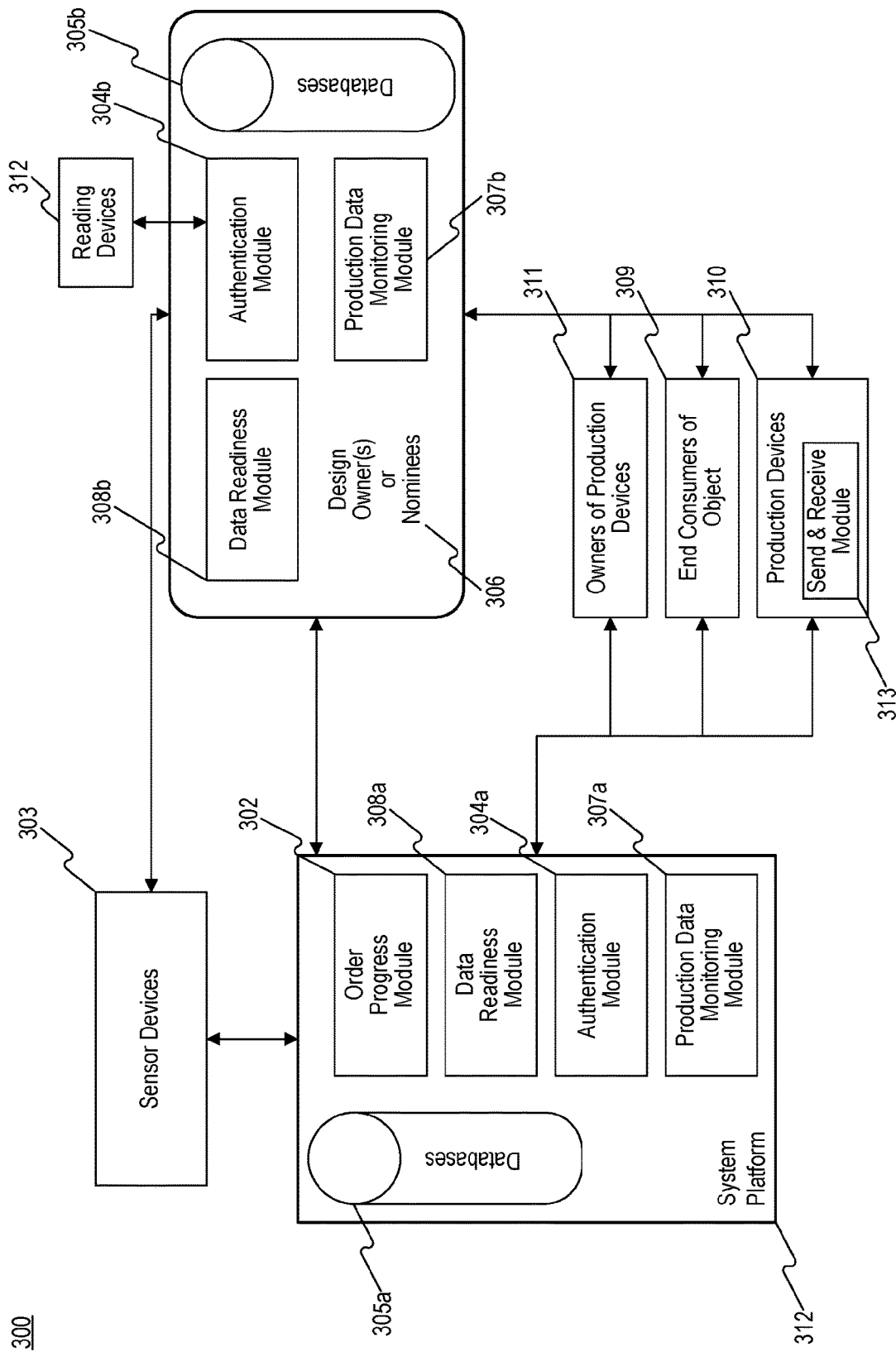
FIG. 3 (300) illustrates an alternative Overall System Architecture where most information is retained and held by the Design Owner(s).

FIG. 3 300 illustrates a preferred embodiment of an alternative embodiment of the system architecture described in FIG. 2. The main difference from FIG. 2 is that this embodiment assumes that most information continues to be held by the Design Owner(s) 306 that enables them to remain in control of this information and share it directly with requesting buyers. Accordingly, a plurality of computer systems, which may be associated with different design owners, may serve as production engines for providing digital production data to one or more production devices. In embodiments, a digital production management platform may route or otherwise provide routing instructions for data transmissions between such computer systems and production devices. This can be described as a mostly peer-to-peer (P2P) version of the server-client model illustrated in FIG. 2. Note that the Design Owners(s) 306 can also include, or be instead, proxies or nominees of the Design Owners. In particular, the Design Owner(s) 306 continues to remain in control of the Data Readiness Module 308b and only allows the System Platform 312 to undertake actions associated with the module it cannot or does not wish to execute. Similarly, the Design Owner(s) 306 has the choice to execute on its equipment all or part of the Authentication Module 304b, for which it may or may not interact with a Reader Device 312. It can also limit the access to the Authentication Module and Databases 305b for limited range users and Reader Devices. Accordingly, the platform may create or administer a multi-tiered access system, e.g., for design file owners or for production device operators, to name a few. Finally, the Design Owner(s) 306 may also decide to control the Production Data Monitoring (PDM) Module 307b and the associated control to Sensor Devices and the data received from Production Devices 310 for this purpose. It controls which data is stored on its Databases 305b, or on the Databases 305a of the System Platform 312. The Order Progress Module 302 continues to be controlled by the System Platform and any communication with Owners of Production Devices 311 and End Consumers of Objects 309 may be managed by either the System Platform or the Design Owner(s).

Figure 4A:
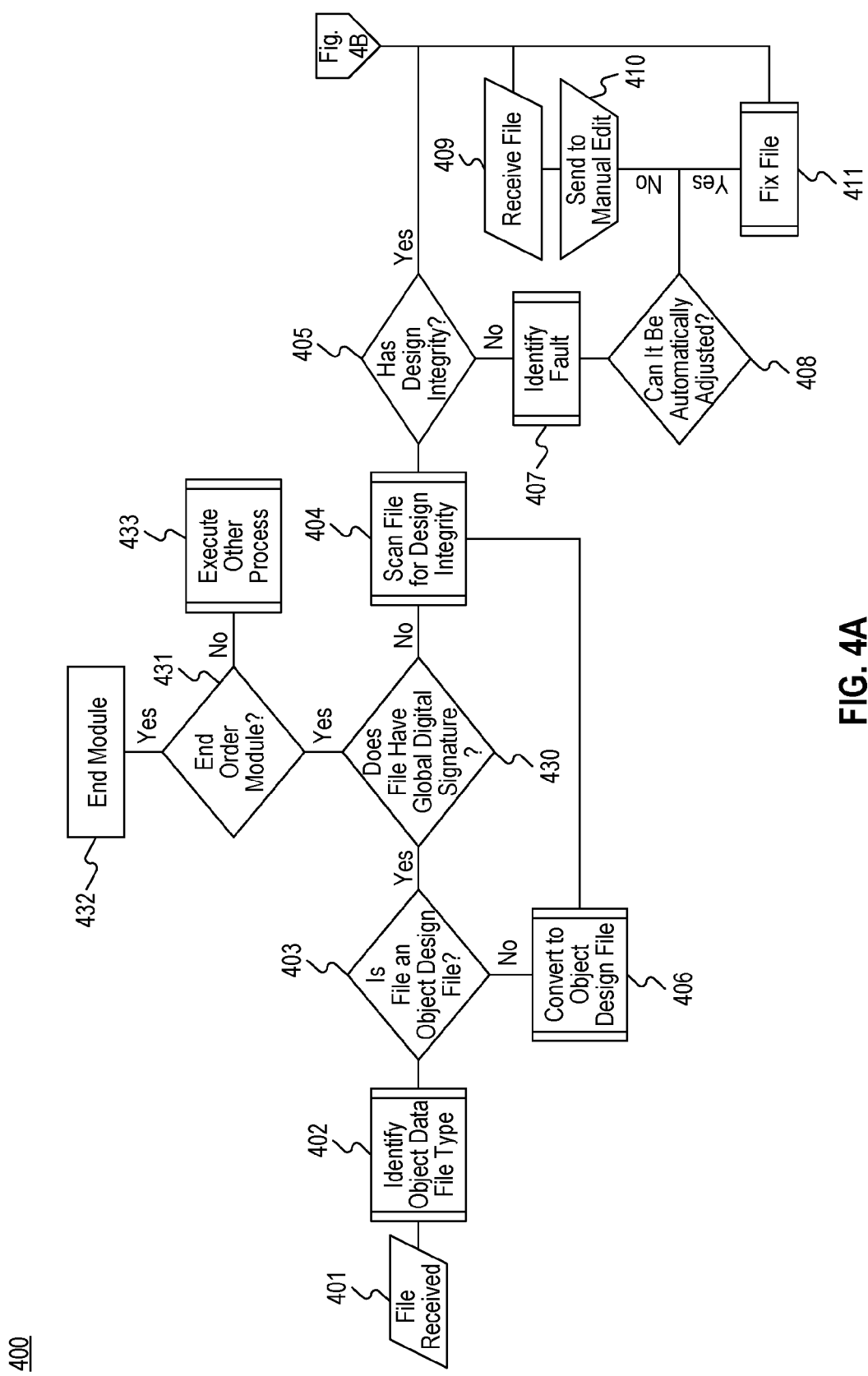
FIG. 4A (400) illustrates the Data Readiness Module process that verifies if a given Object Design File from the original Design Owners(s) is in the proper form to be produced by the Production Device and then takes action to modify the file if it is not.
Figure 4B:
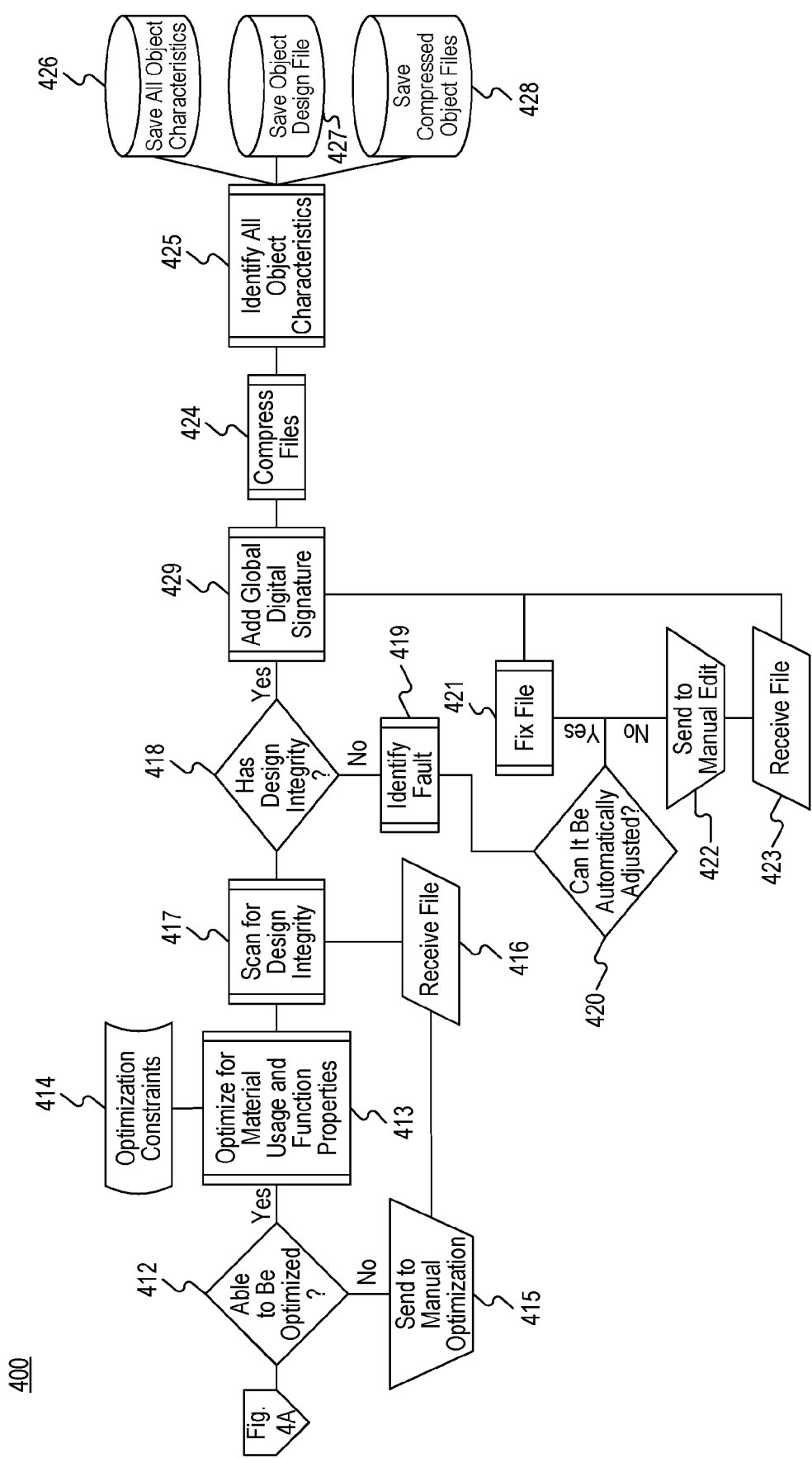
FIG. 4B (400) illustrates the Data Readiness Module process that verifies if a given Object Design File from the original Design Owners(s) is in the proper form to be produced by the Production Device and then takes action to modify the file if it is not.
Figure 5A:
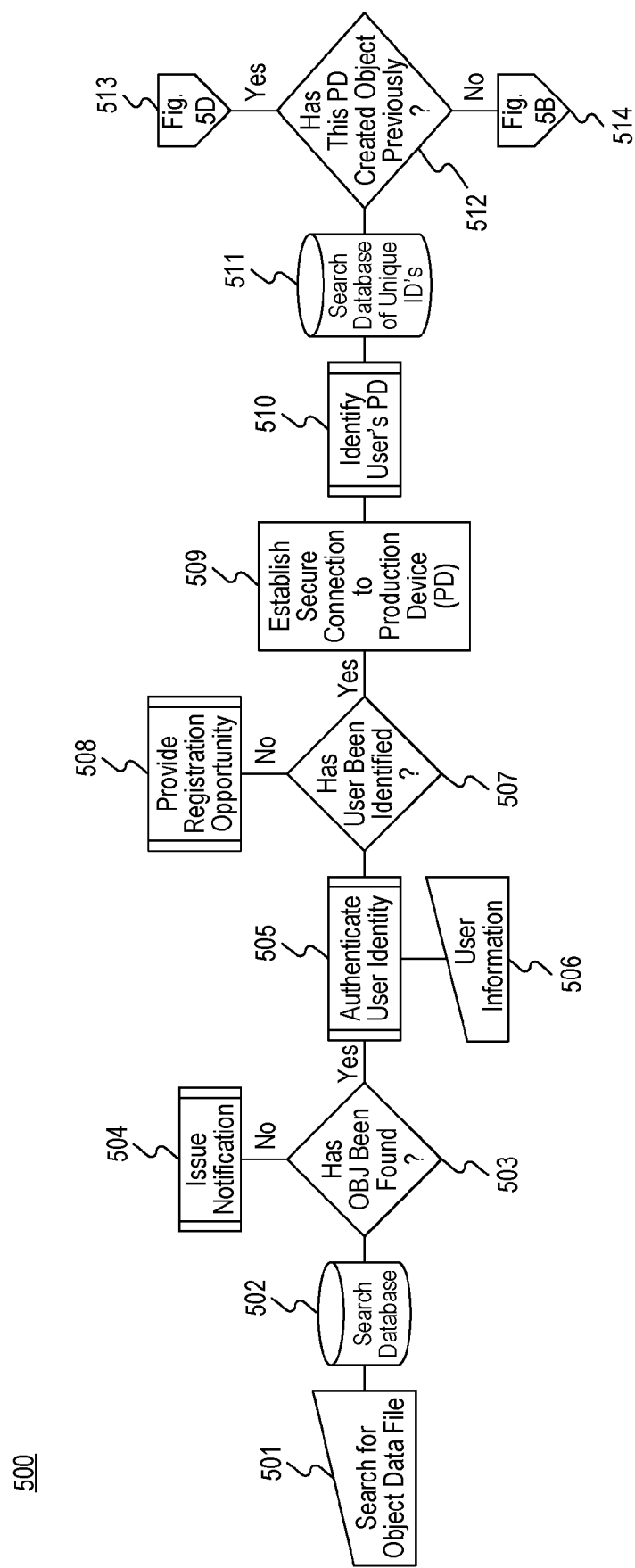
FIG. 5A (500) illustrates the Order Progress Module method taken by the Owner of the Production Device to obtain an Object Production File from the System Platform.
Figure 5B:
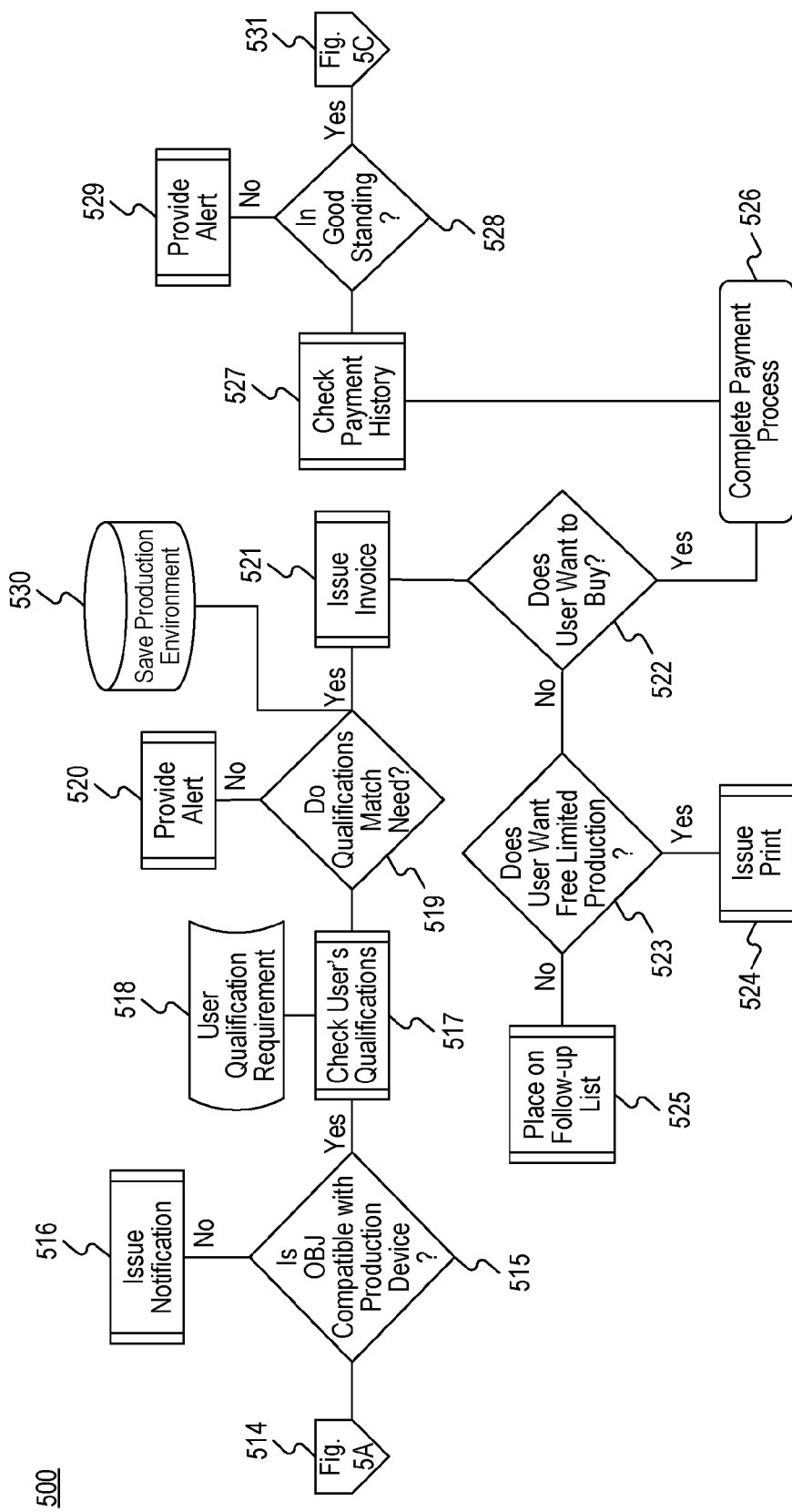
FIG. 5B (500) illustrates the Order Progress Module method taken by the Owner of the Production Device to obtain an Object Production File from the System Platform.
Figure 5C:
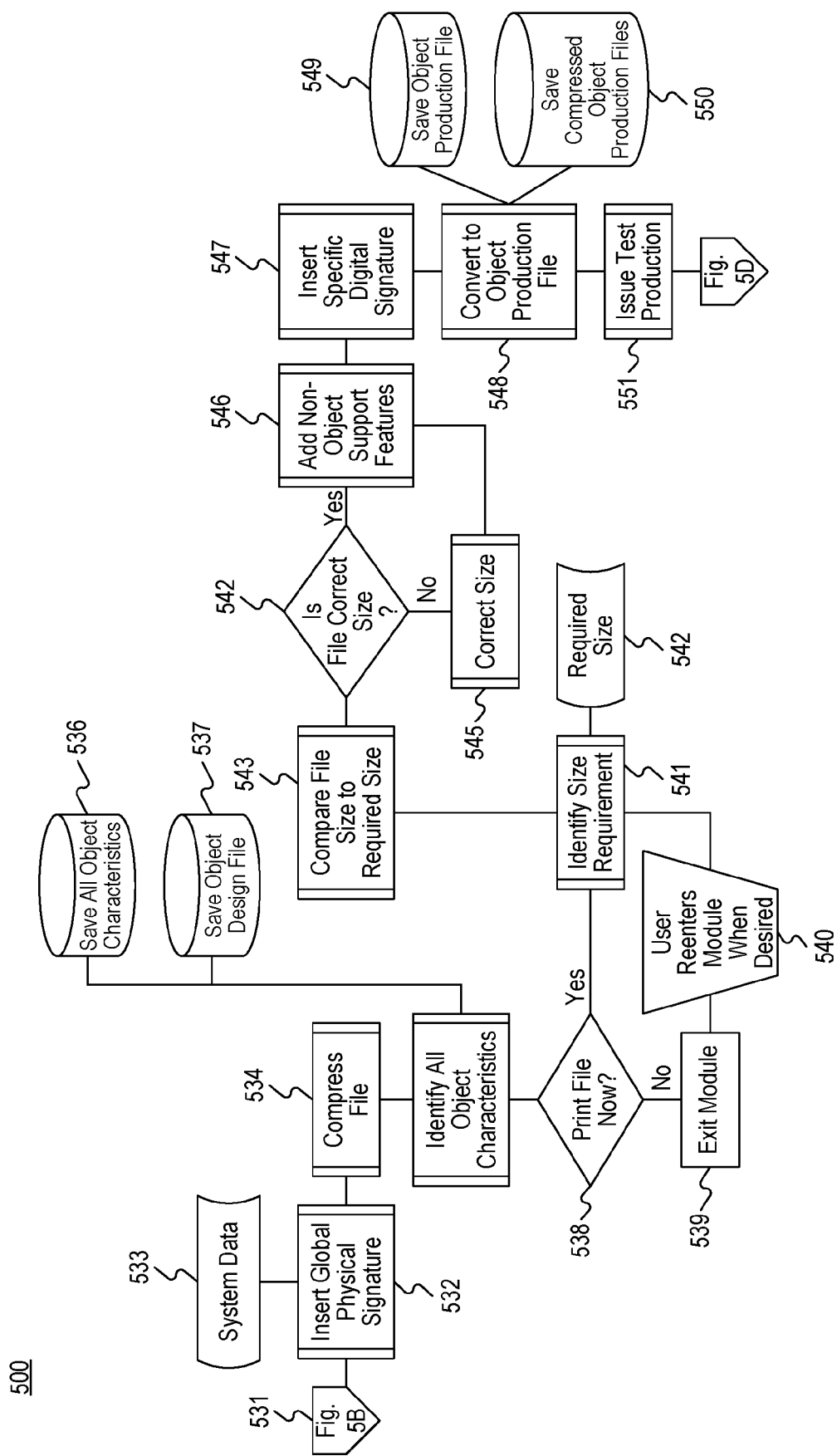
FIG. 5C (500) illustrates the Order Progress Module method taken by the Owner of the Production Device to obtain an Object Production File from the System Platform.
Figure 5D:
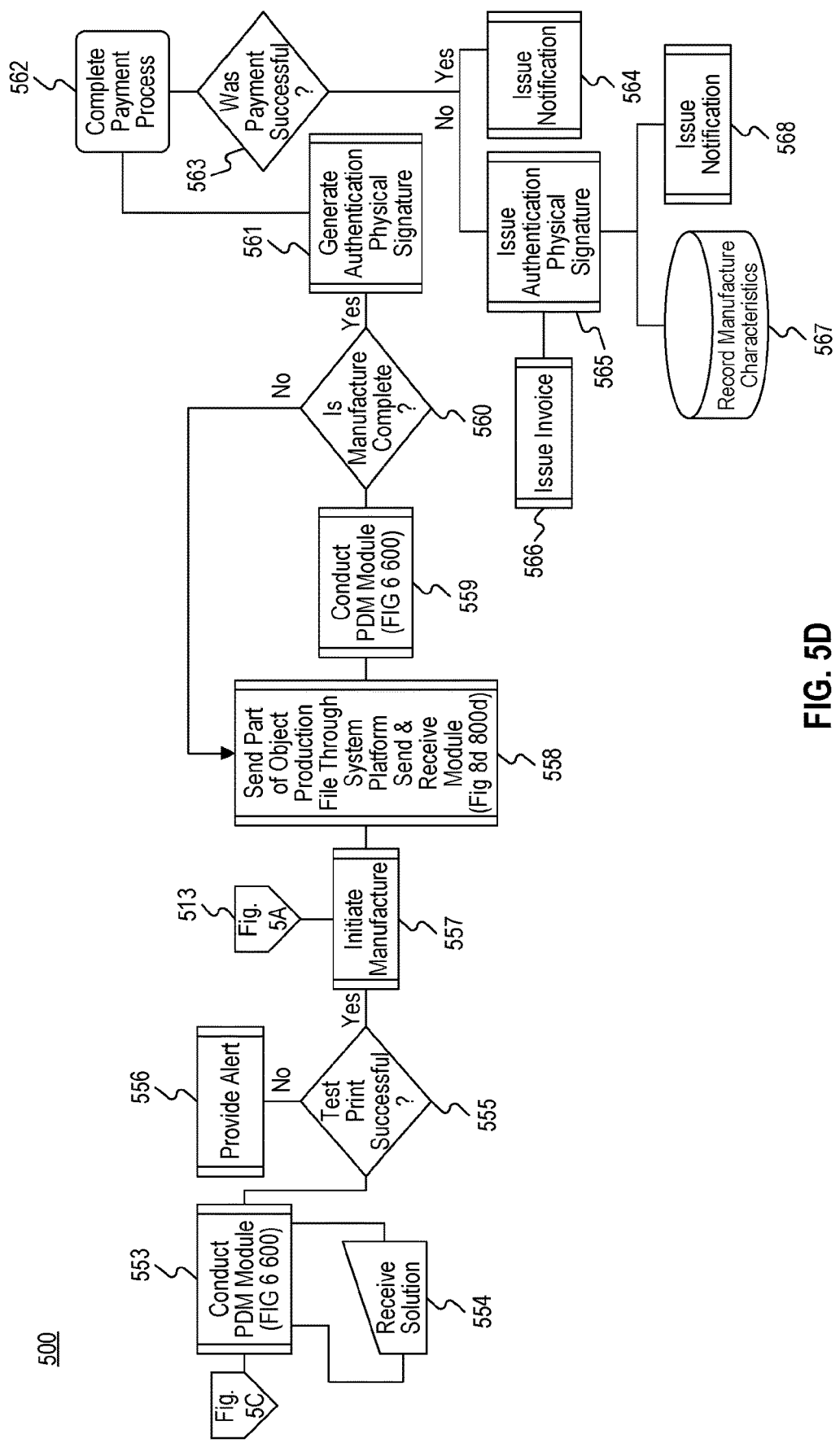
FIG. 5D (500) illustrates the Order Progress Module method taken by the Owner of the Production Device to obtain an Object Production File from the System Platform.

FIGS. 4A and 4B 400 illustrates a preferred embodiment of the Data Readiness Module 102 that verifies if an Object Data File 113 from the Design Owner(s) 101 is in the proper form to be produced by the Production Device 107 and then takes action to modify the file if it is not. Additionally, the module can enhance the object design by optimizing object properties like material used, strength or flexibility. The method of the Data Readiness Module 306 is executed by the System Platform 103. In one embodiment of the invention, the System Platform 103 sits on the Design Owner(s) side of the network (shown as 306). In another embodiment, the System Platform 103 sits on the production side of the network (shown as 312). If there is a multitude of incoming requests to prepare an Object Data File through the Data Readiness Module, these may be handled by a queuing system, by automatically expanding server capacity, or by identifying similar calculation patterns and merging production of multiple different file production events. To start the process, the System Platform 103 receives the Object Data File 113 from the central Design Owner(s) 401 and evaluates the file type 402. During this process additional characteristics of the Object Data File, as well as the underlying object represented therein can also be analyzed and corresponding actions may be suggested or taken. The underlying object may be identified by analyzing the Object Data File without additional information provided. An example of additional characteristics that may be determined is the identification of whether the underlying object is registered on a black list, such as a list of export controlled objects. Additionally, further processing decisions, such as the selection of the method of conversion to an Object Production File, may be derived at least in part from the identified characteristics. Further automatically identified characteristics may also reveal design intention and/or determine the way in which the object is to be set up in the Production Device, amongst others. If the file is not in a proper digital design form or rather is not an Object Design File 114, the file is converted to a proper digital design form that then contains all information needed to be later converted into an Object Production File 115 and produced 406. Next the Object Design File is checked for the Global Digital Signature and/or Specific Digital Signature embedded in all object files that are produced through the present invention 430. Such signatures may be digital watermarks. In the event that a design file is stolen and then subsequently submitted to the System Platform 103 in the hope of attaining legitimizing features, these signatures can expose the file, which may be only one of the features of these signatures, as described herein. The System Platform 103 will then make a decision 431 of ending the module process 432 or executing a number of other possible processes 433 such as issuing a notification to the Design Owner(s) 101 or seeking a manual decision. Next the Object Design File 114 is analyzed to ensure that the design has integrity 404. For example, in additive manufacturing and other manufacturing and printing processes, the System Platform 103 may check that the object design is closed, has no gaps in the surface mesh (e.g., water tight), manifold (edges are not shared between more than two surfaces), and surface normals are correct (pointing in correct direction). If a fault in the design is identified 407, it is then determined whether the design can be automatically adjusted to fix the fault 408. If so, the adjustment is made 411. If automatic adjustment is not possible, the Object Design File 114 is sent to an external entity to be manually edited 410 and is returned upon completion 409. At any point in this process where subsequent edits are made to the object design, the new design may be returned to the Design Owner(s) 101 for approval to ensure that there are no undesired effects. Now that the file type and design integrity have been verified, the third step is to automatically and simultaneously optimize both the amount of material comprising the design and other specific functional properties of the object 413, within specified constraints 414 on these variables, which primes the design for optional optimization during the Order Progress Module 104 method of FIGS. 5A, 5B, 5C, and 5D. During this modification of the object design file to achieve enhanced object properties, it is also possible to embed in the objects structure, composition, or any number of object properties a pattern, code or signature that will tell the end object owner, once the object is produced, something significant about the object. This method of information embedding could serve the same purpose as that of the Global Physical Signature that is described in the Order Progress Module 104 method of FIGS. 5A, 5B, 5C, and 5D. It can be used to prevent unauthorized copying. If the automatic optimization returns an error or for any other reason is not able to choose optimal material usage and function property values, the file is sent to an external entity to be manually optimized 415 and is returned upon completion 416. Next, the object design is analyzed again to ensure that, due to the modifications, the design is not now physically impossible to produce (has design integrity) 417. If a fault is found 419, the file is either automatically adjusted 421 or, if not possible, sent externally to be manually edited 422 and received upon completion 423, as described previously. At this point a Global Digital Signature, specified by the Platform 429, is embedded in the file 434 which can serve a number of purposes from giving the file identification with the Platform to causing the file to be unusable by non-authorized parties. A Global Digital Signature may be a digital watermark in the object design file, which may identify the file, e.g., as having previously interacted with the Platform 429. A Global Digital Signature may comprise one or more digits or characters inserted into a file or a particular portion of a file, such as a header or another less predictable location in the file. Subsequently, the file is compressed 424 and, after all the object characteristics are identified 425, if possible, these characteristics, the Object Design File, and each iteration thereof created during the Data Readiness Module are all saved on the platform and stored in respective Database 205/305.

FIGS. 5A, 5B, 5C, and 5D 500 illustrates a preferred embodiment of the Order Progress Module 104 method, the process taken by the Owner(s) 101 of the Object Production Devices 105 to obtain a desired Object Production File 115 from the System Platform 103. This module is generally the only one permanently hosted by the System Platform 103. The Owner(s) of the Object Production Devices have the ability to issue search commands to the System Platform Database 501 through a variety of methods including, but not limited to, submitting an object picture or technical drawing, outdated product number, or a number of other search parameters as required. Once the System Platform 103 receives the search request, it searches the databases 502, and in the event of not being able to find the object 503 issues a notification to the user 504. If the object has been found, the next step is to verify the identity of the user 505 through a password or other identifying User Information 506. If the identity of the user cannot be verified, he or she is provided the opportunity to register 508. Next, the System Platform 103 identifies the user's Production Device 510, which is achieved by establishing a secure connection to the device 509 and matching the device's unique identifier and settings with those recorded in the System Platform Database of Unique Production Device IDs 511. The secure connection can enable secure multi-channel communication between the Production Device and the System Platform. These channels may consist of a channel for design data, a channel for feedback data, a channel for Production Device control information, to name a few. In embodiments, the channels may be communicated through the same communication infrastructure or medium. In embodiments, channels may identify a source and destination of a communication or series of communications (e.g., data communications). In embodiments where channels have common destinations and sources, the channels may comprise portions of a single communication or set of communications, portions of a communication pathway, and/or the same communication or set of communications. If the Production Device has produced the object before from this specific object file, then the process can follow the Option 1 Path 513 and production can begin immediately. If not, then the process must follow Option 2 Path 514 which has several steps before production can begin.

The first step in the Option 2 Path is to verify if the object is compatible with the Production Device, in other words, can it be produced by the given Production Device 515. If not, a notification is issued to the user 516. If so, the user's qualifications are then checked 517 and if they do not meet the minimum User Qualification Requirements 518 such as having the correct permit to produce the object or having no record of illegal activity then the user will be sent an alert 520 with a set of steps they could take to meet the minimum qualifications, and the production environment identified is simultaneously saved in the respective database 530. If minimum qualifications are met, the user is issued an invoice 521 and given the opportunity to purchase the Object Design File 114. If the user opts not to buy, he or she is given the opportunity to receive information about the Object Design File 114, which allows the user to see some facsimile and/or useful information about the object 524 but does not allow him or her to produce the object 524. If the user chooses to buy the file, he or she is asked to complete the payment process 526. Alternatively, depending on a variety of factors, the user may be able to complete the payment process at a later stage, for example immediately before the Authentication Physical Signature is applied at this end of this entire process or afterwards. Upon the user's completion, the System Platform 103 checks the user's payment history 527 and if the user is not in good standing, an alert is sent to the user 529, possibly with steps on how to return to good standing. There is an override possibility to this function and all other verification steps, which can be issued by any authorized party. If the user is in good standing, then all verification steps on the user have been completed and a Global Physical Signature is inserted 532 into the Object Design File 114 determined by certain system and user parameters 533. This Global Physical Signature will be a hard-to-remove physical indicator in the produced object itself that will tell an End Consumer that the object was produced on this invention System Platform 103 using the given Object Design File 114, among other possible information. It is important to note that this signature is not unique to the specific instance of an object's production, like the Authentication Physical Signature applied after object production and thus not as complex. The Authentication Physical Signature can be a physical watermark specific to the instance of the object that tells the End Consumer if it was produced to the correct specifications and the correct quality. It may be inserted during or immediately following production or added later after production is monitored (e.g., after quality assurance is assessed, which may involve the use of sensor or reader devices, as described herein). Next the file is compressed 534, all object characteristics are identified where possible 535, and this new form of the Object Design File 114, along with the object characteristics are saved in the Platform Databases 536/567. Then the user is given the choice 538 of producing the file immediately or exiting the module 539 and returning to produce the object at a later time 540. If the user chooses to continue onto production, the next step is to identify the user's Required Size 542/541 which they could have specified during the earlier order process or now, and compare it to that of the current Object Design file. If the Object Design File size is not correct, it is automatically adjusted 545 taking care to still monitor the design's integrity. Next designs for non-object support structures or rather any physical piece that is not part of the final object but is needed for production to occur (such as dissolvable support legs in polymer additive manufacturing) are added to the Object Design File 546. Next, the file is embedded with a Specific Digital Signature, specific to this instance of producing this design file 547. This signature serves a similar purpose as the earlier stated Global Digital Signature but can communicate more specific information such as the production date and/or an identifying number or sequence of characters, to name a few. Finally the Object Design File 114 is converted into an Object Production File 115 548 which is a file in the immediate print-ready form or language utilized by the Production Device. Subsequently, the Object Production File 115 and a compressed form of the file are saved to the Platform's Database 549/550.

Now actual file transfer to the Production Device and production initializations begins. Firstly, the user is issued a test production 551 which allows the user to produce an object with inherent highlights that are only distinguishable once the production is complete, on his or her Production Device 107 while the Production Data Monitoring Module 109 is simultaneously executed 553. If the test production is produced successfully, as verified by the data received through the Production Data Monitoring Module 109, or the test is initially not successful but is fixed through the automatically generated solution 554, then production of the actual object can begin. If it is not produced successfully and no automatic solution can be applied, an alert is sent to the user with steps to take to remedy the issue 556. Now, at this point in the process where production is soon-to-be initiated 557, the Option 2 Path 514 finally catches up with the Option 1 Path 513. Continuing on, production is initiated by sending part of the Object Production File 115 to the user's Production Device 558, performing the steps detailed in the Production Data Monitoring Module 109 (method described in FIGS. 6, 6B, and 6C) 559 and then continuously repeated until the object production is complete 560. The design owner, e.g., using software or a website to interface with a digital production management platform, can set criteria to govern whether to allow the reprint of the object based upon certain criteria or the satisfaction or non-satisfaction thereof, such as if the object production has not been marked as complete, if less than 100% of the object production data has been transferred, the existence or degree of trust established with the user, whether a minimum percentage of the object has already been produced, whether production device feedback indicated a fault, and/or a number of other criteria. These criteria can be applied fluently without additional input from the design owner during production. For instance, a design owner may decide to permit reprints if less than 90% of the object design data has been transferred while another may decide that the limit is 70%. Such limits or other criteria may be input by the design owner into the digital production management platform (e.g., using a website interface), stored in one or more databases (e.g., a database of user settings), and/or programmed into computer code used by the production management platform to control reprinting. The production isn't fully complete until the Authentication Physical Signature is generated 561 and produced as part of the object, which only occurs if the object was produced with the correct specifications and full payment is received. If the payment process is completed successfully 562, then the Authentication Physical Signature, usually in the form of a final layer of the object, is sent to the Production Device 565. Additionally, an invoice 564 and notification 568 is sent to the user while the production occurrence is recorded in the System Platform Databases 567.

FIGS. 6, 6B, and 6C 600 illustrates a preferred embodiment of the method of the Production Data Monitoring Module 109, which is referenced during the Order Progress Module 104 (method described in FIGS. 5A, 5B, 5C, and 5D). This method involves continuously collecting real-time object production information via Sensor Devices 108 and the Production Device 107, verifying correct production by comparing with expected results, and then allowing the Order Progress Module 104 to continue iteratively delivering pieces of the Object Production File 115 from the System Platform 103 to the Production Device 107, via the System Platform Send & Receive Module (method described in FIG. 8d 800d). In embodiments, monitoring may be performed periodically. The module begins by the System Platform 103 or Design Owner(s) 101 receiving and saving 603 object production data collected by the Sensor Devices or the Production Device, sent through the Sensor Device Send & Receive Module (method described in FIG. 8b 800b) 602 and the Printer Device Send & Receive Module (method described in FIG. 8c 800c) 601, respectively. This information is then compared to a database of Expected States 604 that corresponds to the specific stages of production 605. The generation of these Expected States is further described in FIG. 6*b* and is subject to a Margin of Error 607, whose generation is described in item FIG. 6*c*. If the data is found to be within the Margin of Error 606, then the error level, which is a score based on the difference between the data received and the base state expected, is saved 608. Next, a running total of error levels is computed 625, and then compared to Acceptable Limits 609, which are determined either manually or otherwise 610. If it is found to be within Acceptable Limits, then the process is returned to the Order Progress Module (method described in FIGS. 5A, 5B, 5C, and 5D 500) to continue the process of sending & receiving pieces of the Object Design File to be produced. Once production of the object piece is complete, this PDM Module method is started again and processing data from both Sensor Devices 602 and Production Devices 601 resumes afresh. This process continues until either the production completes or unacceptable production error is found, whichever comes first. It is important to note that the Production Device Send & Receive Module (method described in FIG. 8*c* 800*c*) and the Sensor Send & Receive Module 677 (method described in FIG. 8*b* 800*b*) are both utilized in order for the System Platform 103 to receive data from these respective devices securely through a process of encryption, decryption, and embedded codified digital signatures.

Now moving on to look at the alternative path, if the data received is not within the Margins of Error 607, then it is determined whether this is the first time that such an infraction has been noticed 613. If this is indeed the case then an alert is issued 614 to the Owners of the Production devices 105, the End Consumers of the Object 209, the Platform managers and any other interested and authorized parties. The alert must be responded to 617 by the predetermined authorized user(s) within a predetermined 615 Delay Length 616 with a Manual Order 617. If the alert is not answered within this delay time period 618, if the present event is not the first infraction 613, or if the cumulative total error level exceeds acceptable limits 612, then the production of the device is paused 620 and interested parties alerted 622. The authorized user(s) can still issue a Manual Order after this point. If the order is to continue 621 then the production module resumes and the processing of data from both Sensor Devices 602 and Production Devices 601 resumes afresh, continuously looping throughout the above described process. If the manual order is not to continue, then the process must either be ended 624 or another process executed 675, which could be an array of actions. For instance, it could be desired to allow the user to continue printing the piece when his or her fraudulency is known in order to be led to other infringers; there are many possibilities.

Figure 6B:
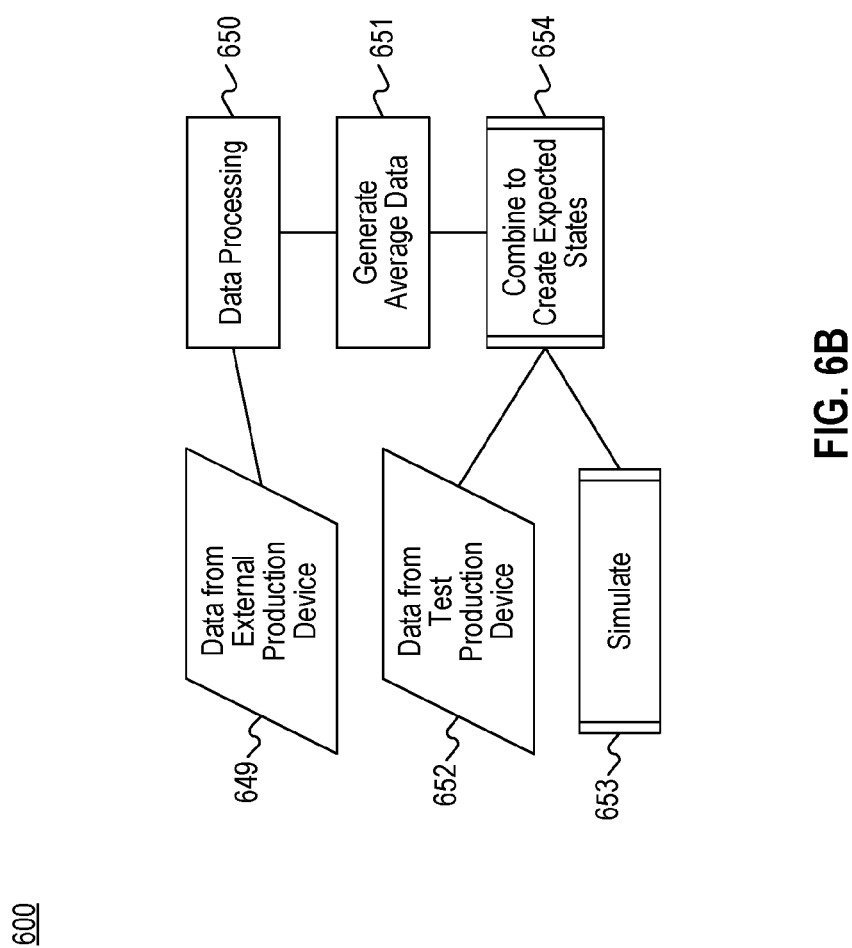
FIG. 6B (600) illustrates the Production Data Monitoring (PDM) Module method of delivering the Object Production File from the System Platform to the Production Device and of remotely monitoring production of the subsequent object in order to detect unauthorized actions.

FIG. 6*b* 600*b* illustrates a preferred embodiment of the process of determining the Expected State 604. To do so, many object production data sets received from external production devices of similar types 649 is averaged together 650 after possibly being sorted, weighted and otherwise processed 651. This data is combined with data from Test Production Devices 653, which are operated under tightly controlled conditions, as well as with data from object production simulations 653/654. In embodiments, an Expected State 604 may comprise expected feedback data. An Expected State 604 may be determined based at least in part upon historical data, test data, data received or accessed from external databases, and/or data derived from any of the foregoing, to name a few.

FIG. 6*c* 600*c* illustrates a preferred embodiment of how the Margins of Error 607 are computed. They result both from the addition of Manual Orders 672 with the expected Errors of Sensors 671 previously detected or otherwise known, and from the Data from External Sensor Devices 670. As more objects are produced, the amount of available data increases which increases certainty held in the calculated Expected State 604 that allows the margin of error to be adjusted. Permissible Margins of Error 607 may depend on the type of object produced, designer requirements, previous and/or current feedback from production devices or sensor devices, geography, and/or environmental conditions, to name a few.

Figure 7:
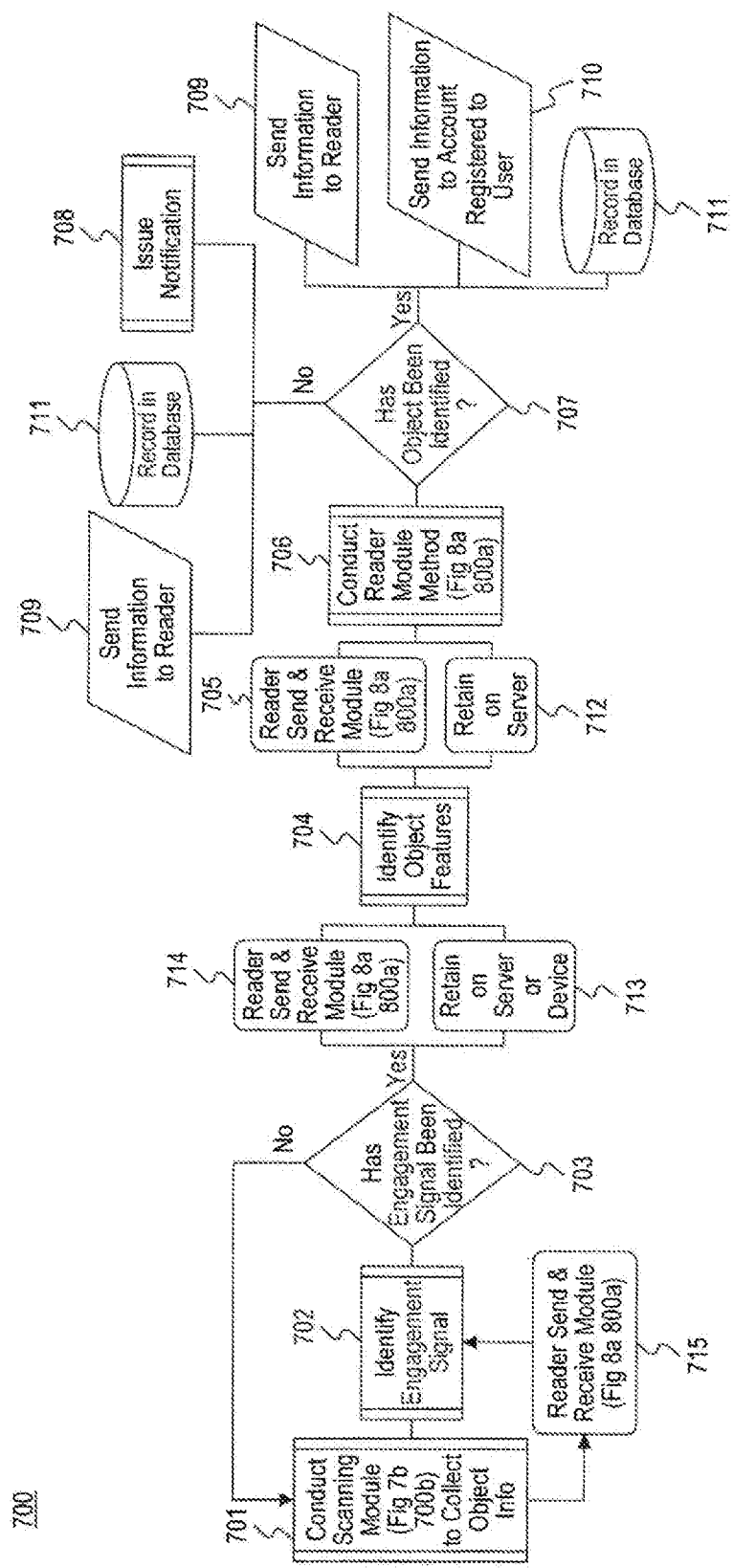
FIG. 7 (700) illustrates the overall Authentication Module method taken by the Reader Device and System Platform to detect object properties after the Object is produced and then to verify the object's authenticity.

FIG. 7 700 illustrates a preferred embodiment of the Authentication Module 112 method, the process that the Reader Device 111 follows to evaluate object-specific information which either validates or denies the Object's 116 authenticity. To begin the process, users, whom are likely the End Consumer(s) 110, use the Reader Device to collect object-specific information through the Scanning Module (method described in FIG. 7*b*) 701, and then convey this information, through use of the Reader Send & Receive Module 715 (method described in FIG. 8*a*), to the System Platform 103 which can determine if there is an Engagement Signal 702. Alternatively the identification of the Engagement Signal can occur on the device 702 without sending data to the System Platform 103, yet this is less secure and thus usually a less desirable option. The Engagement Signal is required to begin the Reader Module method (FIG. 7*a*) and it may be a variety of object-specific information, including a steganography surface layer that was added during the object's production or specific material properties of the object. If an Engagement Signal has not been identified 703, then the process loops back continuously to complete another information collection 701, until either an Engagement Signal has been identified or the user aborts the Authentication Module process. If an Engagement Signal is identified, then the full information set is sent, using the Reader Send & Receive Module 714, to the System Platform 103 which processes the data to identify all object features 704. This object feature identification process can also be conducted on the Reader Device itself, depending on user or Design Owner requirements 713. An additional possible feature is to send much unneeded data or even fake data along with the needed information data set in order to disguise the type of content being relayed; leaving information out can be as revealing as displaying the protected information within. Data transmissions may be encrypted. Once all object features have been identified and this information has been transferred on to the System Platform 103 (represented here in 705) or retained on the device 712, depending on which user chooses, the Reader Module (method described in FIG. 7*a*) is deployed 706 which analyzes the collected object feature information to determine object authenticity. After this process is completed, if the object authenticity cannot be conclusively determined, notifications are sent to all relevant users 708, results are sent back to the reader 709, and a log entry of the event is recorded on the Platform's databases 711. Conversely, if the object's authenticity can be confirmed, a log entry of the event is also recorded 711, information is conveyed to all associated users 710, and relevant information is sent to the Reader Device 709. Such notifications or other data transmitted to a user or to a digital production management platform can comprise, at least in part, feedback data.

Figure 7A:
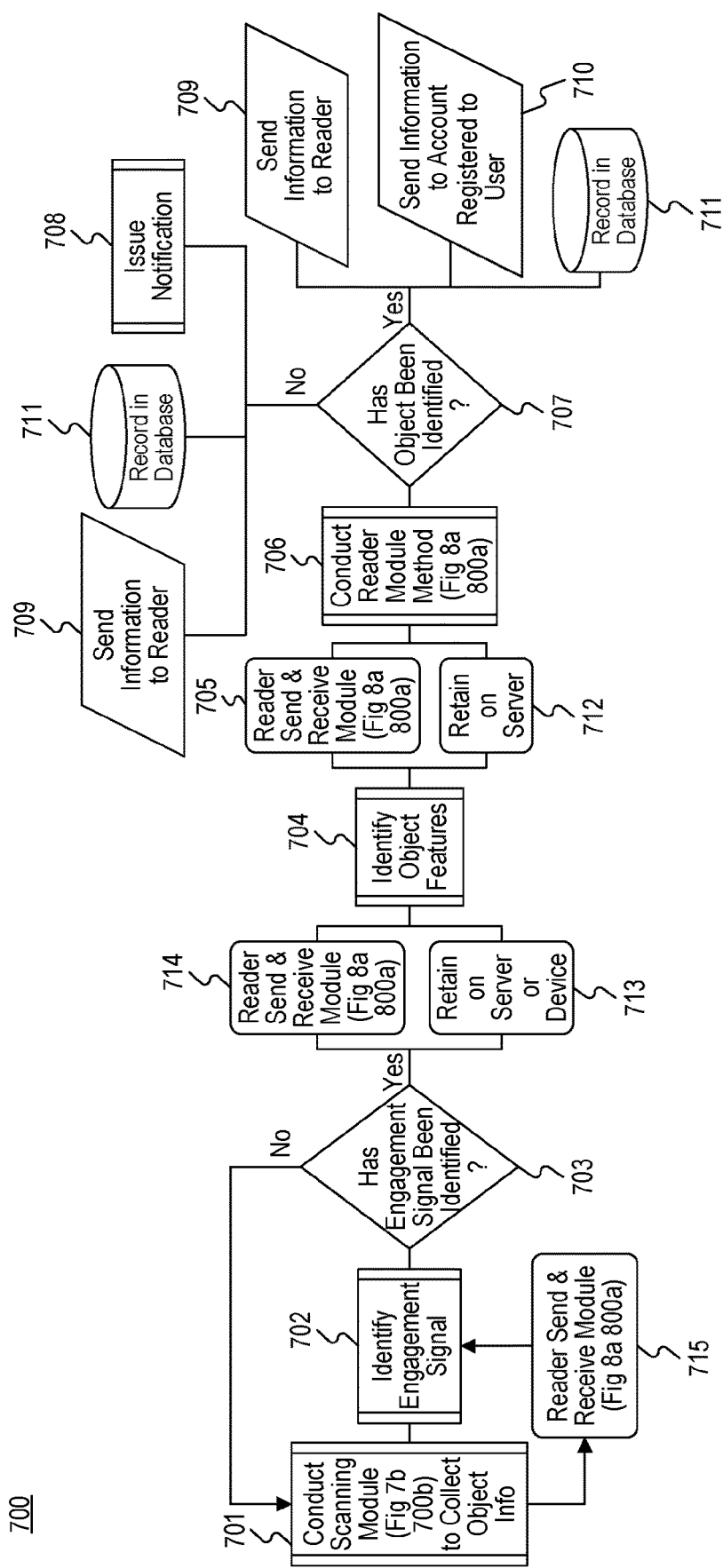
FIG. 7A (700a) illustrates the Reader Module method portion of the Authentication Module method.

FIG. 7*a* 700 illustrates a preferred embodiment of a Reader Module, a sub-process of the Authentication Module 112 that involves the System Platform 113 checking object-specific information collected by the Reader Device 111 to verify the Object's 116 authenticity. The Platform does so by receiving the object-specific information 716 from the Reader Device 709 through the Reader Send & Receive Module such as the coloring of the object, information related to object steganography or any other object feature that can be identified without touching the object. The Platform then analyzes this information starting with the Object's surface & material feature information 717, then conducts the Signature Reading Module method (described in FIG. 7c) to analyze codified and/or hidden signatures 718, and lastly analyzes other remaining information 727. With each analysis stage, the Platform verifies received information by referencing information on the Platforms Database's specific to the given Object 116. If the object features(s) have not been identified, then more information will be requested 719, 724, 729 which, if provided, will loop the process back to re-check the given object feature(s). After a number of iterations without successful verification, the entire process can be aborted 720, 725, 730 and a notification is then sent to all interested parties 721, 726, 731. This is an important step for fraud detection. Similar to an ATM PIN code that is limited to a number of tries, our invention can tighten security and red flag possible infringers. If identification has been positive, then the process is ended by sending notifications to the Reader Device and all relevant users 740. All events and information compiled during this process is logged on the Platform Databases 205/305.

Figure 7B:
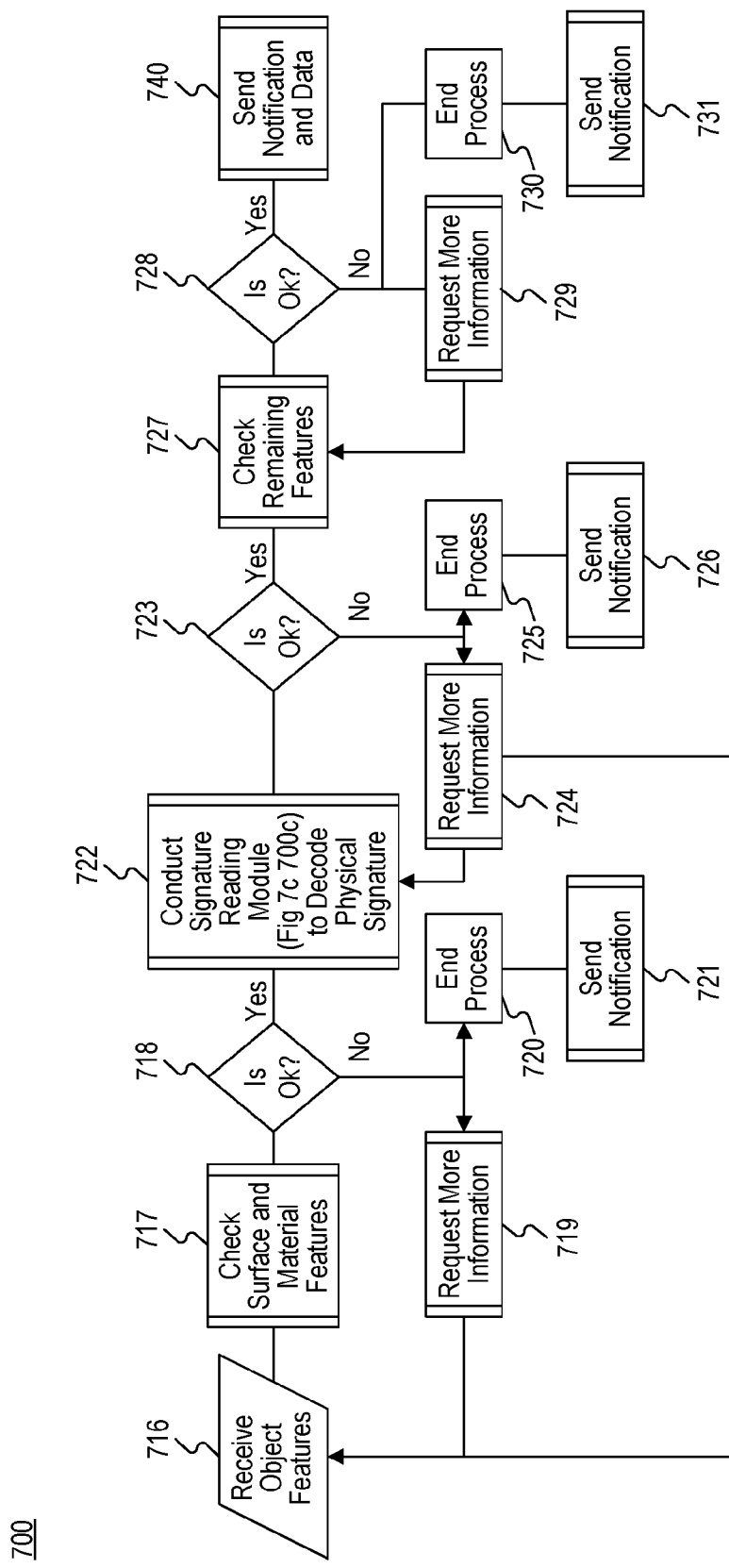
FIG. 7B (700b) illustrates the Scanning Module method portion of the Authentication Module method.

FIG. 7b 700b details the process highlighted in 701, by which information of the object is collected by the Scanning Module. The module method reacts to a manual issue to scan 701b by requesting information about the part to be scanned 702b and issuing positioning information 703b, which directs the user as to the way in which the reader must be placed in relation to the object or any other instructions related to the reading of the object. Once this stage is complete, the reading is conducted through one of multiple reader sensors 704b. The level of information obtained is then considered for completeness 706b by either the System Platform 103 after being sent there 705b through the Reader Send & Receive Module Method FIG. 8b or retained on the device 709b. If the information received is not sufficient then the process is repeated until the information is sufficient. In each iteration of this repetition, the positioning information may be changed 708b. Once sufficient information is received FIG. 7 700 is continued.

Figure 7C:
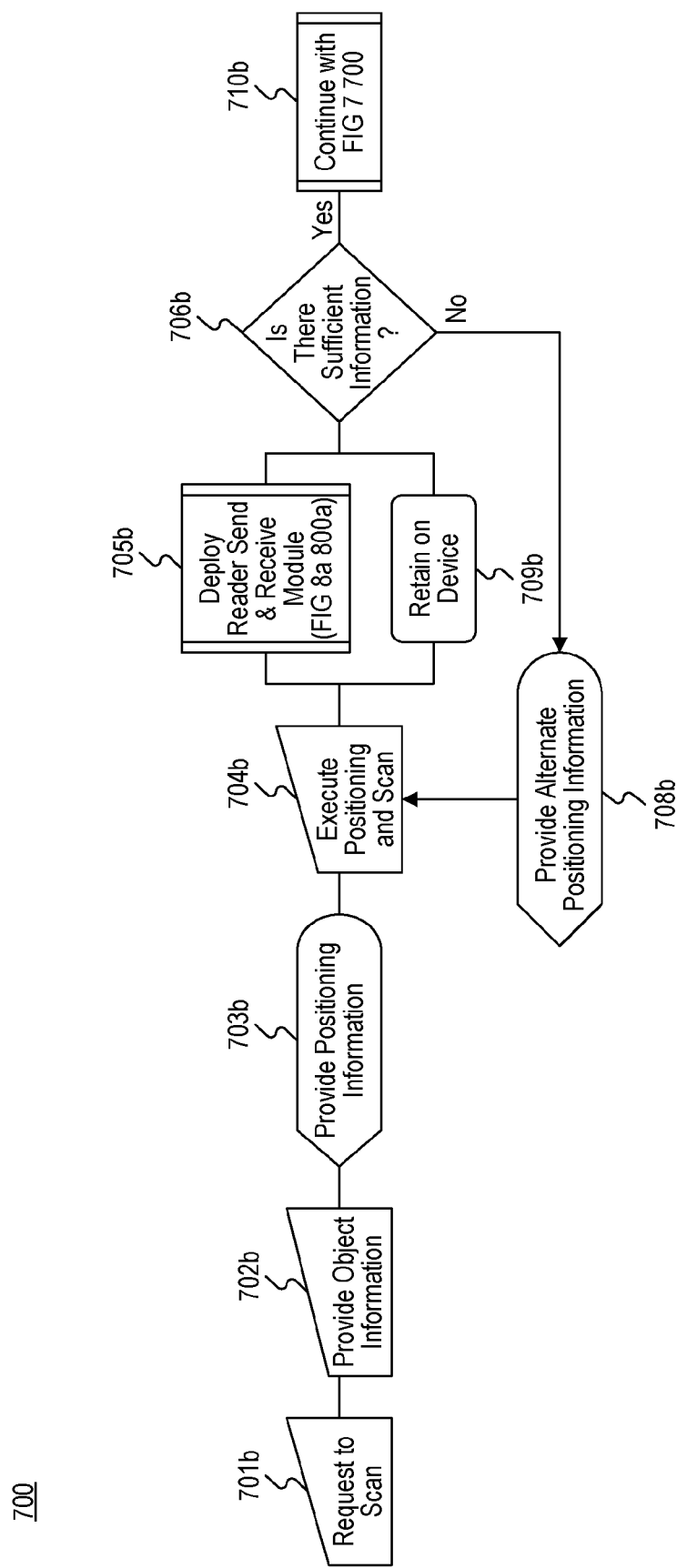
FIG. 7C (700c) illustrates the Signature Reader Module method portion of the Authentication Module method.

FIG. 7c 700c represents the Signature Reading Module Method, which describes how encoded information is received 701c, decoded 702b and relevant features identified 703c. Once these have been identified they are compared 705c to a database of expected features 704c, based on the type of object and other information. Upon completion, FIG. 7a 700a continues.

Figure 8:
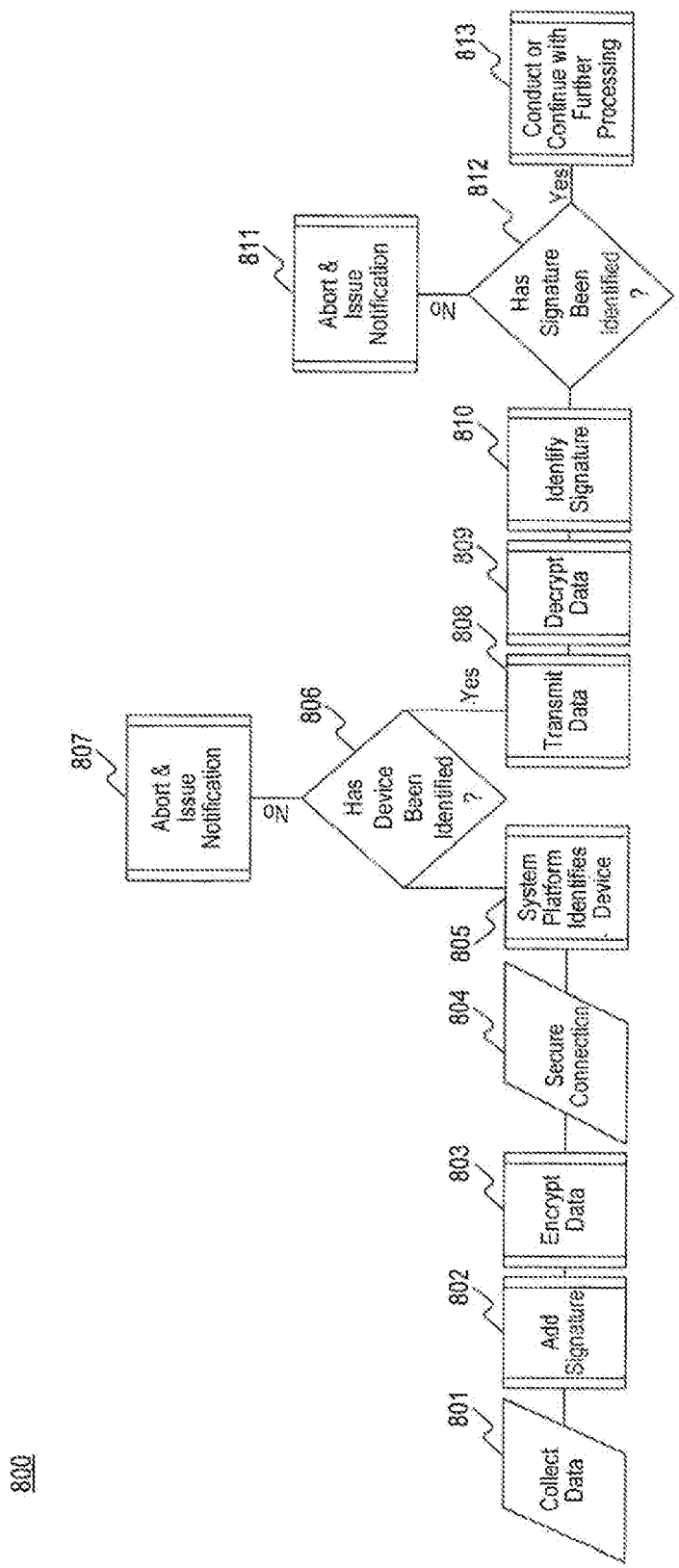
FIG. 8 (800) illustrates the Send & Receive Module method that exists between the System Platform and relevant hardware, the Reader Device, Sensor Device, and Production Device, to securely send object-specific, device-specific, and platform-specific information between these parties.

FIG. 8 800 illustrates a preferred embodiment of the Send & Receive Module 106 method which displays a general form of the more specific sub-modules: the Reader Send & Receive Module (method described in FIG. 8b), the Sensor Send & Receive Module (method described in FIG. 7b), and the Production Device Send & Receive Module method described in FIG. 7c. This module is referenced in the Production Data Monitoring Module (method described in FIGS. 6, 6B, and 6C) and the Authentication Module (method described in FIG. 7) and is required to convey information securely in between the remotely-located Platform and utilized devices like the Reader Device 111, Sensor Device 108, and Production Device 107.

Figure 8A:
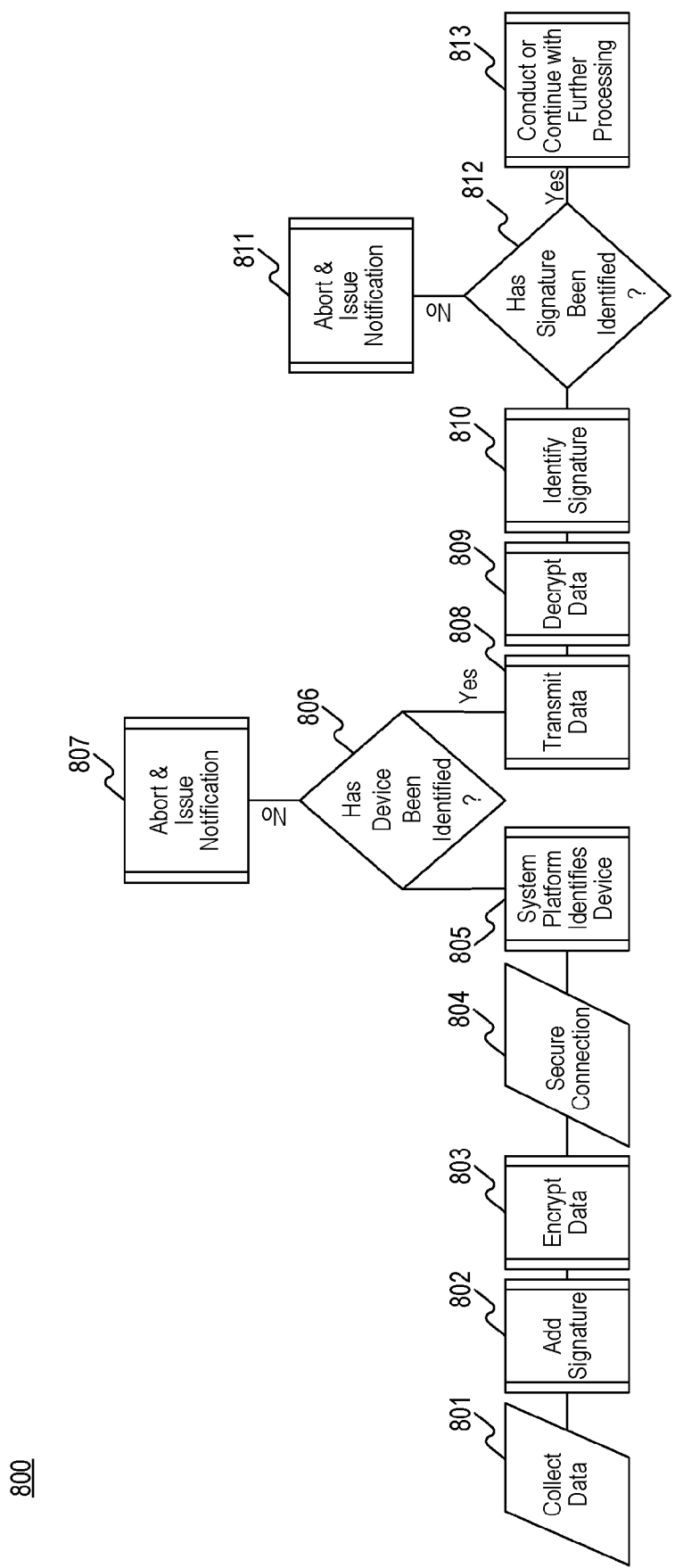
FIG. 8A (800a) illustrates the Reader Send & Receive Module method that is a specific sub-module of the Send & Receive Module method.

In FIG. 8a, this Reader Send & Receive Module method begins by the device filtering out the desired information from all the object-specific information collected 801a and adding a Signature to this filtered information 802a. This Signature on the data itself enables verification of the data's authenticity later on by the Platforms and ensures that the data's origins lie with this reader device and have not been tampered with. This data is then encrypted 803a and a secure connection is established between the Reader Device and the System Platform 103 (represented here as 804a). On connection, if the System Platform 103 can identify the Reader Device as an authentic device 805a, then data transfer can begin 808a. If it cannot be identified, then the process is aborted and notification are sent to reader and other relevant parties 807a. Upon successful reception of data by the System Platform 103, the data is decrypted 809a and the data's Signature(s) identified 810a. If the Signature(s) is not identified 811a, then the process is aborted and notifications are sent to all interested parties 812a. If it is identified, then all verification processes have then been completed and the Platforms now has confidence in the authenticity of the data and that it comes from the scanning of a produced Object. The Platforms then proceeds with the specific case purpose of sending the data in the first place 813a. Throughout this process all information and events are logged on the Platforms databases.

Figure 8B:
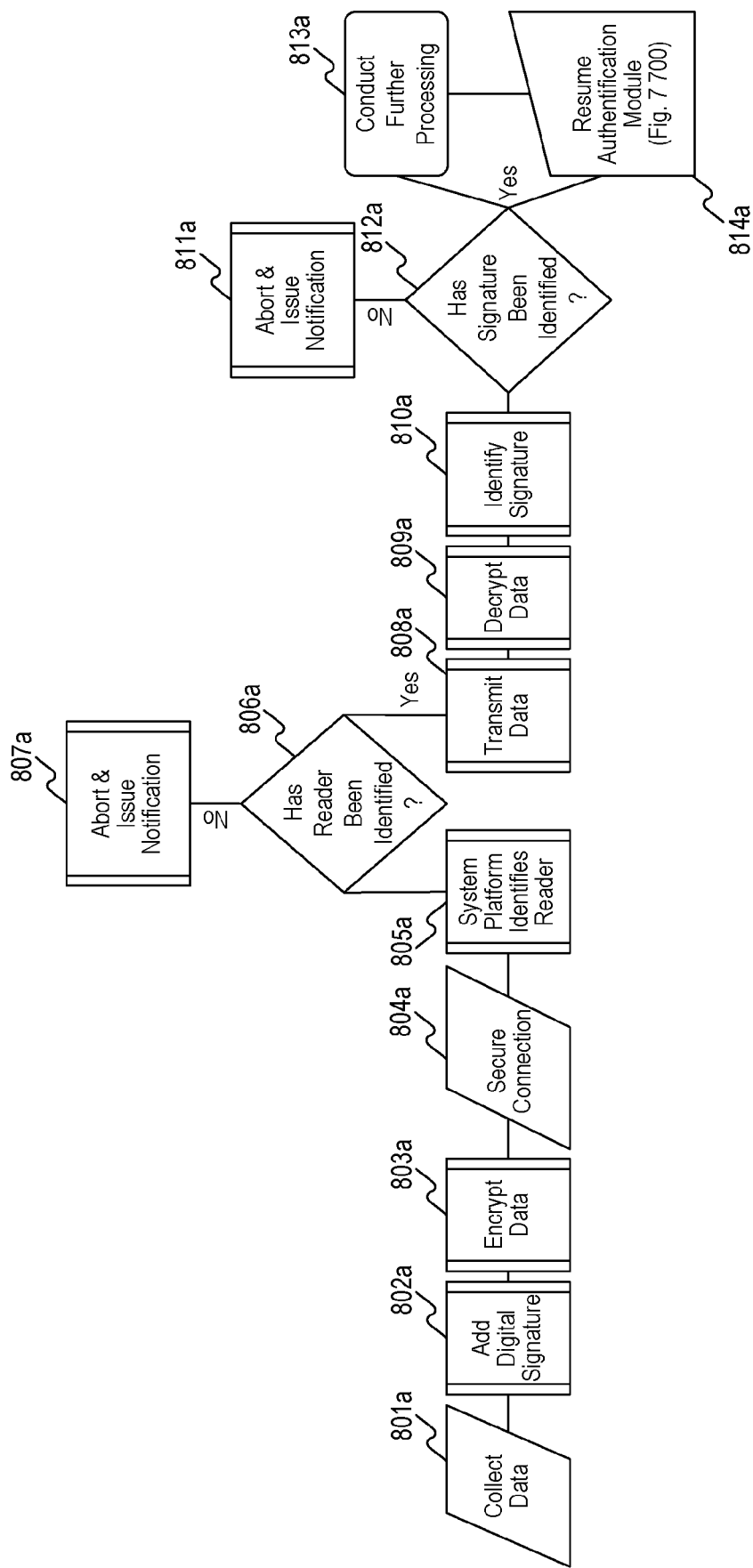
FIG. 8B (800b) illustrates a preferred embodiment of the Sensor Send & Receive Module method.

FIG. 8b 800b illustrates a preferred embodiment of the Sensor Send & Receive Module method. This method describes the process of encrypting & sending collected information on object production from the Sensor Device(s) 108 to the System Platform 103 and the System Platform 103 receiving and decrypting the information to verify correct, authorized object production.

Figure 8C:
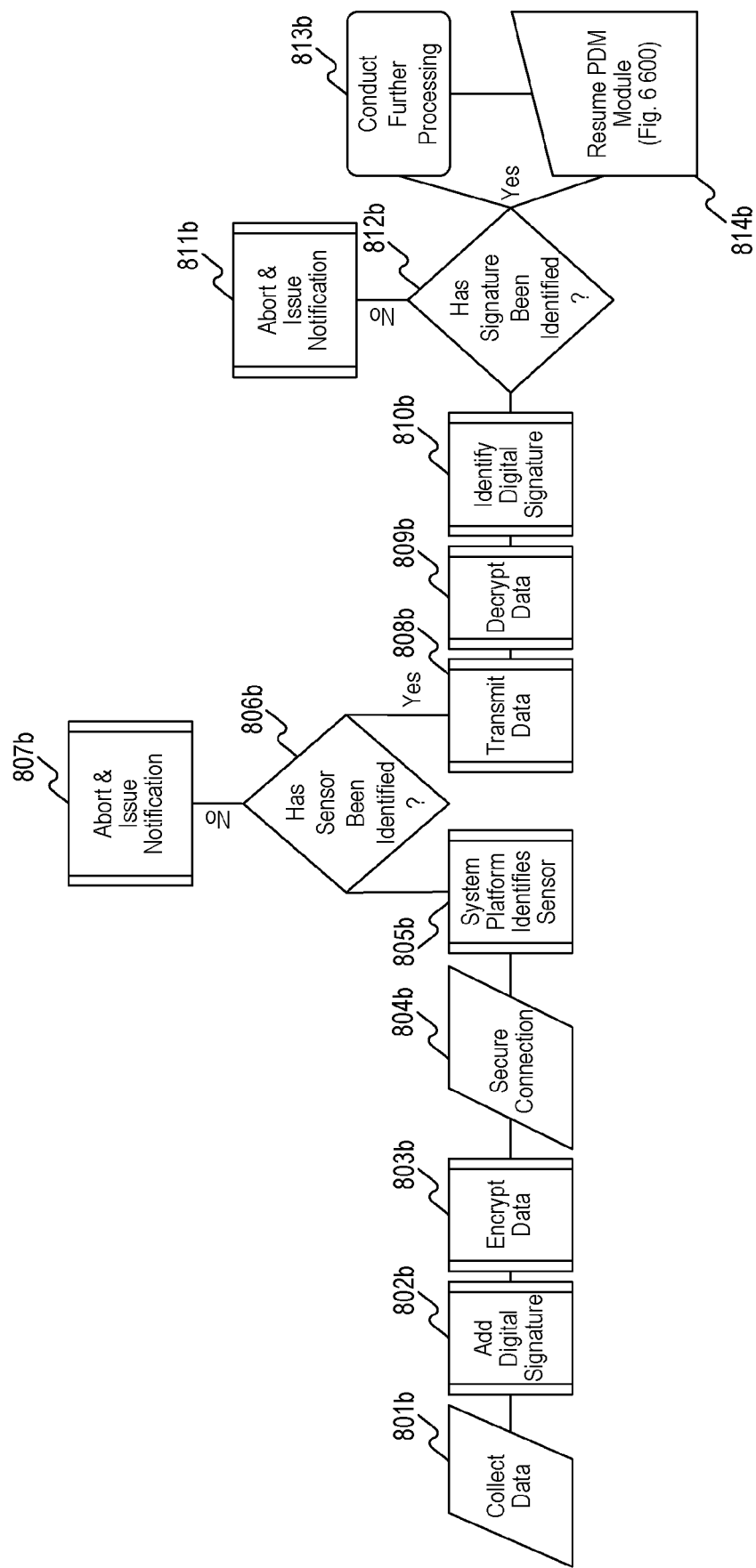
FIG. 8C (800c) illustrates a preferred embodiment of the Production Device (PD) Send & Receive Module method.

FIG. 8c 800c illustrates a preferred embodiment of the Production Device Send & Receive Module method. This method describes the process of encrypting & sending collected information on object production from the Production Device 107 to the System Platform 103 and the System Platform 103 receiving and decrypting the information to verify correct, authorized object production.

Figure 8D:
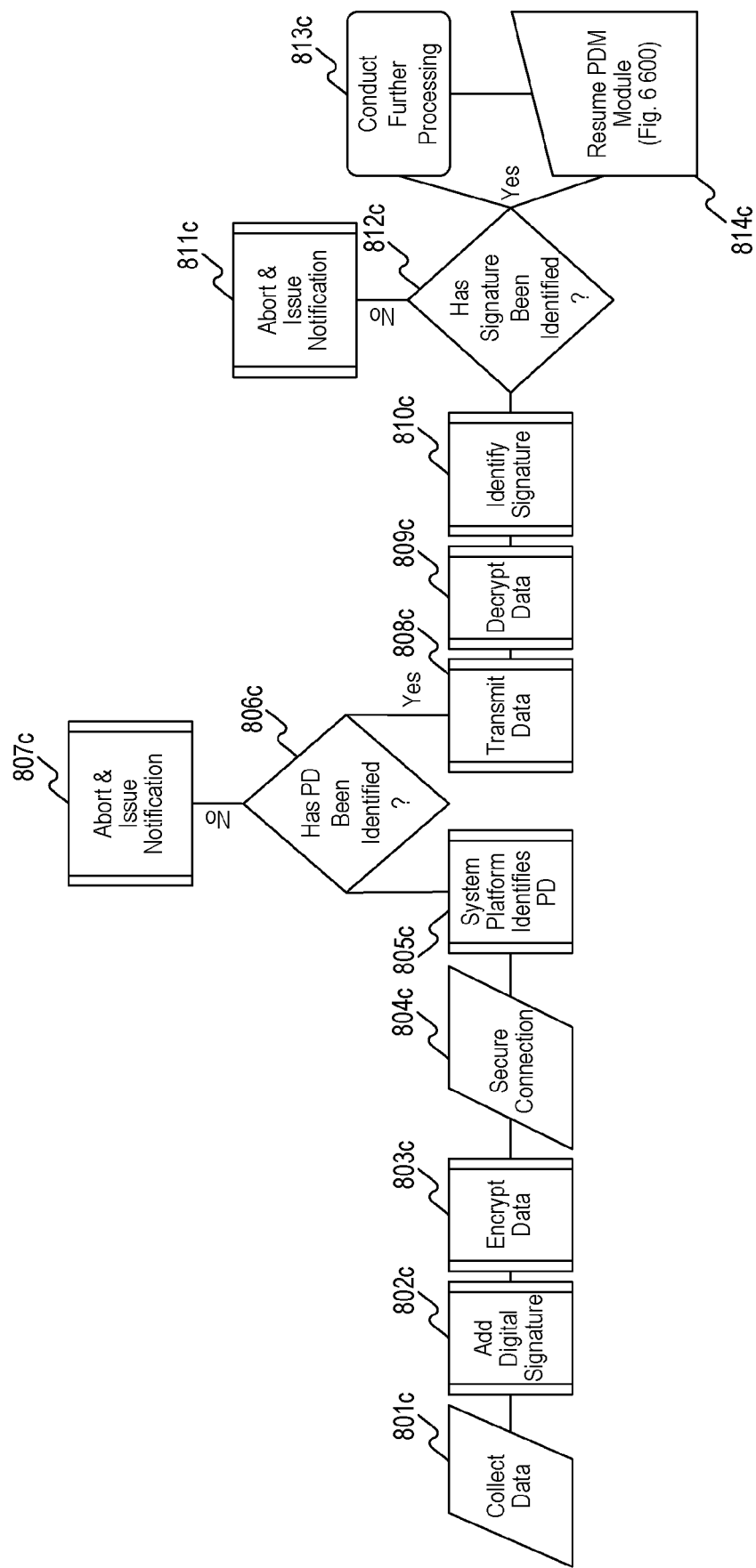
FIG. 8D (800d) illustrates a preferred embodiment of the System Platform (SP) Send & Receive Module method.

FIG. 8d 800d illustrates a preferred embodiment of the System Platform Send & Receive Module method. This method describes the process of encrypting & sending parts of the Object Production File 115 to the Production Device 107 from the System Platform 103 and the Production Device 107 receiving & decrypting the file part to be used in object production. In this Method, a part of the Object Production File 801d is selected to which a Digital Signature is added 802d. This data is then encrypted 808d and the connection to the Production Device secured 804d, as described in FIGS. 5A, 5B, 5C, and 5D. Once the Production Device has been identified 805d, the transmission of the data begins 808d, whereby the Method can automatically decide whether, for how long, and how much of the part of the Object Production File shall be saved locally on the Production Device or otherwise (e.g., an external non-transitory computer-readable storage device, such as an external hard drive). This process may entail determination of a required or optimal buffer. This decision can be influenced by the processing speed of the Production Device, the extent of data being shared, the time taken to establish the initial connection, the data transfer speed, perceived safety, data security considerations, and/or other factors, to name a few. Buffer size calculation may entail a weighing of multiple factors. Before use, the data is decrypted 809d, the digital signature identified 810d and if these processes have been completed correctly, further processing is completed 813b, respectively the Order Progress Module process is continued as described in FIGS. 6, 6B, and 6C.

Figure 9:
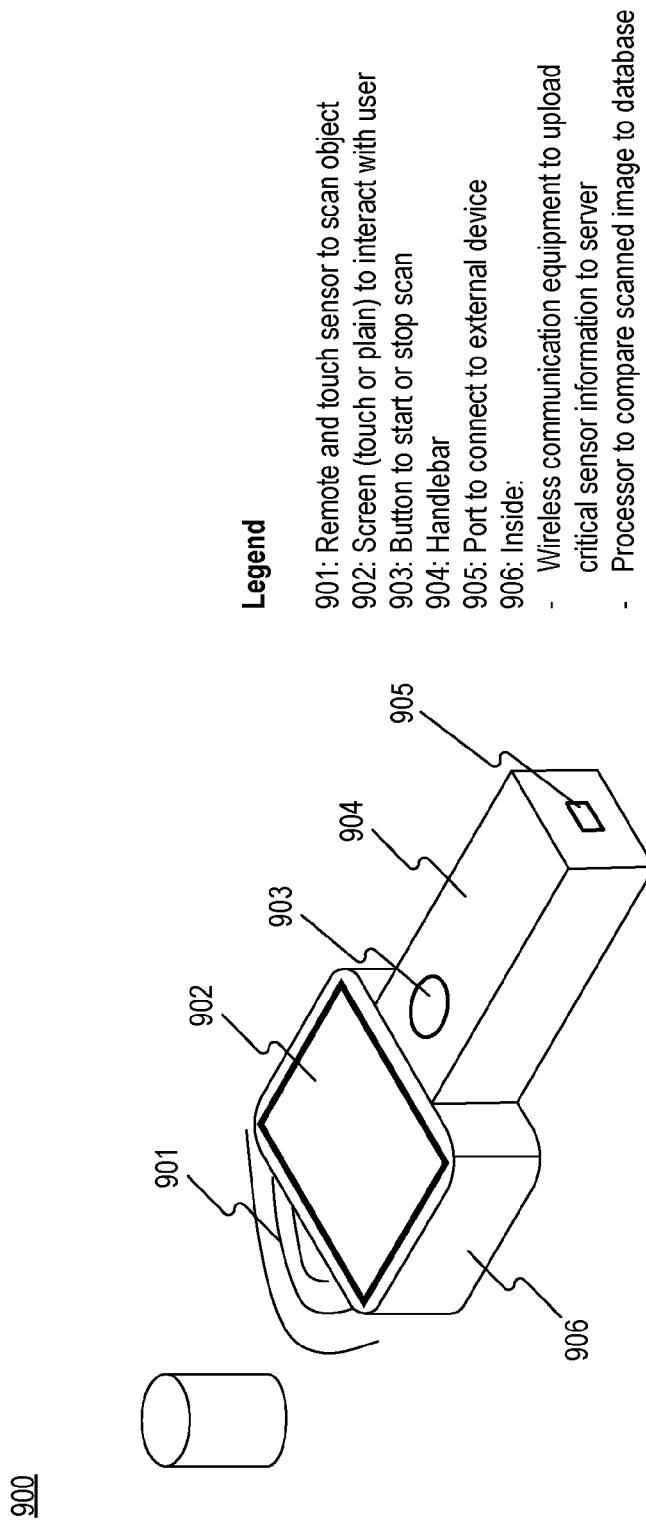
FIG. 9 (900) illustrates the Reader Device that is utilized to detect object properties after the object is produced and verify the object's authenticity.

FIG. 9 900 illustrates a preferred embodiment of a reader device with which an object can be scanned with a variety of sensors to authenticate said objects. It consists of a number of sensors at the top of the device 901 that measure an object either by scanning the object at a distance to identify shape and external features or touching the object to identify material and other object features that are internal to the object. Information is displayed on the touch screen 902, through which commands can also be issued. Further commands can be issue via a button 903, which is located on the handlebar 904. The device can communicate wirelessly or by being connected to a host through the port 905. The device also includes a range of processors that allow it to conduct the processes described in FIG. 7.

FIG. 10 1000 illustrates a preferred embodiment of a sensor device that can be used to monitor production of objects. It can be placed either inside the production machines in order to measure the internal environment or in the same room as the production machines to measure the external environment. The device consists of a range of sensors 1002 surrounded by hard casing 1001. The internal sensors measure environmental factors that do not require visual measurement, including seismic effects (e.g., tremors), temperature, and other factors. The external sensors 1005, measure factors such as the status of the object production, pollution and other factors that require direct visual measurement. The sensors may also measure material quality. The device includes a small screen 1006 to aid interaction with users and display the device state, as well as a button 1004, which allows the user to issue commands on prompt. To communicate with its host, the sensor device includes a port 1003, as well as wireless communication capability.

FIG. 11 1100 is a legend of elements in the other figures.

Now that embodiments of the present invention have been shown and described in detail, various modifications and improvements thereon can become readily apparent to those skilled in the art. Accordingly, the exemplary embodiments of the present invention, as set forth above, are intended to be illustrative, not limiting. The spirit and scope of the present invention is to be construed broadly.

What is claimed is:

1. A system for digital production, the system comprising:
   one or more digital production devices for manufacturing a three-dimensional object; and
   a digital production management platform comprising one or more processors and at least one non-transitory computer-readable memory, wherein the digital production management platform is configured to:
      receive a first data stream from one of a plurality of design owners, the first data stream comprising an object design file, the object design file comprising a digital signature embedded within the object design file, wherein the digital signature contains at least one of a production date and an identifying code;
      confirm that production is authorized based on the digital signature;
      securely stream a second data stream to at least one of the one or more digital production devices, the second data stream comprising a first portion of the received object design file, wherein the first portion of the received object design file comprises production instructions;
      securely stream a third data stream to at least one of the one or more digital production devices, the third data stream comprising a second portion of the received object design file, wherein the second portion of the object design file is streamed after detecting the absence of the first portion of the object design file on the at least one or more digital production devices or after receiving a confirmation of removal of the first portion of the object design file from the one or more digital production devices;
      receive a feedback data stream from the one or more digital production devices comprising at least digital production status data; and
      track and determine the genealogy of a material used for manufacturing the three-dimensional object.

2. The system of claim 1, wherein the plurality of design owners each contributes to the object design file.

3. The system of claim 1, wherein the feedback data stream from the software is configured to provide at least one of current space capacity, current status, an ongoing action report, validation against expected values, analysis and confirmation whether all steps have been completed correctly, and any feedback from third parties to validate a supply chain based on data provided from manufacturing machines or from software that manages the manufacturing machines.

4. The system of claim 3, wherein all or a portion of the feedback data stream can be shared with a buyer and wherein the feedback data stream is configured to provide an insurance product for the three-dimensional product.

5. The system of claim 1, wherein the digital production management platform is configured to determine at least one of a buffer size and a type of data for the second data stream based on at least one of the one or more digital production devices' speed, an object design file size, a duration of a period of time to establish an initial connection with at least one of the one or more digital production devices, and a digital production device download speed.

6. The system of claim 1, wherein data from the feedback data stream is shared with a buyer only when predetermined conditions are met. .

7. The system of claim 1, wherein the digital production management platform is configured to receive an object design file that is not a non-three-dimensional manufacturable file and convert the object design file automatically into a three-dimensional manufacturable file.

8. The system of claim 7, wherein, based on the object design file, material and testing requirements, machines required for manufacture, process steps, machine settings, and shipping requirements are automatically provided.

9. The system of claim 1, wherein the digital production management platform is configured to generate a digital watermark to be inserted into the object design file and to insert a physical watermark design into the object design file, the watermark comprising at least one of raised features and indentations.

10. The system of claim 1, further comprising:
   a reading device configured to detect physical design elements of a three-dimensional object, wherein the reading device is configured to authenticate the manufactured part by comparing detected physical design elements, printer data, and software data to the received object design file,
   wherein the physical design elements are compared based at least in part upon at least one of design structure, material, and surface features and
   wherein the reading device is configured to detect a proprietary physical watermark.

11. The system of claim 1, wherein the digital production management platform further comprises a first sensor configured to detect an environmental condition including at least one of meteorological conditions, barometric pressure, seismic activity, temperature, humidity, and pollution and a second sensor configured to detect material quality.

12. The system of claim 11, wherein the first and second sensors are independently used to monitor quality of the three-dimensional product.

13. The system of claim 1, wherein the feedback data stream includes at least one of production duration, digital production device connection quality, human input, production errors, authenticity data, environmental conditions, and digital production device settings.

14. A system for digital production, the system comprising:
a plurality of digital production devices for manufacturing three-dimensional objects; and
a digital production management platform operatively connected to at least one of the plurality of digital production devices via a data network, the digital production management platform comprising one or more processors and at least one non-transitory computer-readable memory, wherein the digital production management platform is configured to:
receive a first data stream from one of a plurality of design owners, the first data stream comprising an object design file, the object design file comprising a digital signature embedded within the object design file, wherein the digital signature contains at least one of a production date and an identifying code;
confirm that production is authorized based on the digital signature;
securely stream a second data stream to at least one of the plurality of digital production devices, the second data stream comprising at least a first portion of the received object design file, wherein the at least a first portion of the received object design file comprise production instructions;
securely stream a third data stream to at least one of the one or more digital production devices, the third data stream comprising a second portion of the received object design file, wherein the second portion of the object design file is streamed after detecting the absence of the first portion of the object design file on the at least one or more digital production devices or after receiving a confirmation of removal of the first portion of the object design file from the one or more digital production devices;
receive a feedback data stream from the at least one digital production device comprising at least digital production status data; and
track and determine the genealogy of a material used for manufacturing the three-dimensional object.

15. The system of claim 14, wherein the digital production management platform is further configured to:
receive an object design file from the plurality of design owners;
determine compatibility of the object design file with the plurality of digital production devices;
select a digital production device from the plurality of digital production devices based on the compatibility;
determine suitable production device settings for the selected digital production device; and
transmit the determined production device settings
stream the entire file of the processed object design file to the selected digital production device.

16. The system of claim 15, further comprising the digital production management platform being further configured to stream at least portions of the entire file of the processed object design file to the selected digital production device.

17. The system of claim 16, wherein the digital production management platform is further configured to:
process the object design file to ensure compatibility with the selected production device, wherein processing the object design file includes:
identifying object design characteristics;
ascertaining, from a database of object design characteristics, historical object designs; and
accessing, from the database of object design characteristics, historical production data from the production of the historical object designs.

18. The system of claim 17, wherein processing the object design file further includes modifying the object design file based at least in part upon the historical production data.

19. The system of claim 17, wherein the digital production management platform is further configured to:
store object design file data comprising the object design file, any modifications performed thereto through processing, and production feedback data received from the feedback data stream.

20. A system for digital production, the system comprising:
a plurality of digital production devices for manufacturing three-dimensional objects; and
a digital production management platform operatively connected to at least one of the plurality of digital production devices via a data network, the digital production management platform comprising one or more processors and at least one non-transitory computer-readable memory, wherein the digital production management platform is configured to:
receive a first data stream comprising an object design file, the object design file lacking a digital signature embedded within the object design file;
scan the object design file for design integrity;
if the object design file does not have design integrity:
identify a fault in the object design file;
determine whether the fault can be automatically adjusted; and
if the fault cannot be automatically adjusted, manually edit the file to repair the fault; and
add a global digital signature to the object design file.

* * * * *